US012535222B2

(12) United States Patent
Nishijima

(10) Patent No.: US 12,535,222 B2
(45) Date of Patent: Jan. 27, 2026

(54) HEATING COOKING APPARATUS

(71) Applicant: SHARP KABUSHIKI KAISHA, Sakai (JP)

(72) Inventor: Masahiro Nishijima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 814 days.

(21) Appl. No.: 17/795,859

(22) PCT Filed: Jan. 27, 2021

(86) PCT No.: PCT/JP2021/002834
§ 371 (c)(1),
(2) Date: Jul. 27, 2022

(87) PCT Pub. No.: WO2021/153611
PCT Pub. Date: Aug. 5, 2021

(65) Prior Publication Data
US 2023/0076615 A1    Mar. 9, 2023

(30) Foreign Application Priority Data

Jan. 30, 2020  (JP) ................................. 2020-013773

(51) Int. Cl.
*F24C 15/00* (2006.01)
*H05B 6/64* (2006.01)

(52) U.S. Cl.
CPC .......... *F24C 15/006* (2013.01); *H05B 6/642* (2013.01)

(58) Field of Classification Search
CPC .............................. H05B 6/642; F24C 15/006
See application file for complete search history.

(56) References Cited

U.S. PATENT DOCUMENTS

| 8,173,942 B2* | 5/2012 | Wiseman | F24C 14/02 |
| | | | 219/400 |
| 9,532,408 B2* | 12/2016 | Asami | H05B 6/642 |
| 9,615,688 B2* | 4/2017 | Shibuya | F24C 15/327 |
| 9,907,436 B2* | 3/2018 | Reese | A47J 39/006 |

(Continued)

FOREIGN PATENT DOCUMENTS

| EP | 0463726 B1 | 1/1996 |
| EP | 1111964 A2 | 6/2001 |

(Continued)

*Primary Examiner* — Woody A Lee, Jr.
(74) *Attorney, Agent, or Firm* — ScienBiziP, P.C.

(57) ABSTRACT

A heating cooking apparatus (1) includes a heating cooking chamber (10), a housing (14), an opening/closing portion (30*a*), and a microwave supply unit (23). The opening/closing portion (30*a*) includes a flowing portion (31), a cam (32), a drive unit (33), a lid portion (34), and a biasing portion (35). The flowing portion (31) includes an opening (310B) that faces a through hole (10A1). The flowing portion (31) forms, between the flowing portion and the wall portion (10A), an inner space (IR) through which air flows. The cam (32) fits into the opening (310B). The drive unit (33) rotates the cam (32). The lid portion (34) opens or closes the through hole (10A1) in response to the rotation of the cam (32). The biasing portion (35) biases the lid portion (34) in a direction away from the through hole (10A1). The cam (32) presses the lid portion (34) against biasing force of the biasing portion (35) to cause the lid portion (34) to close the through hole (10A1).

8 Claims, 24 Drawing Sheets

(56) References Cited

U.S. PATENT DOCUMENTS

| | | | | |
|---|---|---|---|---|
| 2002/0027700 A1* | 3/2002 | Berneth | ............... | G02F 1/1503 |
| | | | | 428/426 |
| 2009/0032521 A1* | 2/2009 | Kim | ................ | F24C 15/322 |
| | | | | 219/400 |
| 2010/0181308 A1* | 7/2010 | Lee | ................ | H05B 6/6429 |
| | | | | 219/757 |
| 2011/0139014 A1* | 6/2011 | Nishiura | ............... | A23B 2/405 |
| | | | | 99/324 |
| 2014/0305320 A1* | 10/2014 | Kamii | ................ | F24C 7/02 |
| | | | | 99/443 R |
| 2023/0076615 A1* | 3/2023 | Nishijima | ............. | F24C 15/006 |

FOREIGN PATENT DOCUMENTS

| | | |
|---|---|---|
| GB | 2352604 A | 1/2001 |
| JP | H07-042949 A | 2/1995 |
| KR | 100926905 B1 | 11/2009 |

* cited by examiner

HEATING COOKING APPARATUS

TECHNICAL FIELD

The present invention relates to a heating cooking apparatus.

BACKGROUND ART

PTL 1 discloses a microwave oven including a damper. The microwave oven disclosed in PTL 1 includes a heating chamber, a cabinet, a cooling fan, an air damper, a motor, and a cam. The cabinet accommodates the heating chamber. The cooling fan generates cooling air. The heating chamber includes a wall portion in which an air intake port for guiding the cooling air into the heating chamber is formed. The air damper opens and closes the air intake port. The motor rotates the cam. The air damper opens and closes the air intake port in response to the rotation of the cam. The cam has a substantially circular shape. The direction of a rotation axis line of the cam is substantially parallel to the surface direction of the wall portion in which the air intake port is formed. Accordingly, a circular edge portion of the cam includes, in a static state, a portion disposed at a position close to the wall portion having the air intake port formed therein and another portion disposed at a position distant from the wall portion in the thickness direction of the wall portion having the air intake port formed therein. The portion disposed at a position distant from the wall portion having the air intake port formed therein is disposed at a position close to the cabinet. That is, the cam is disposed in the thickness direction of the wall portion having the air intake port formed therein. For this reason, the microwave oven disclosed in PTL 1 uses a space accommodating the cam disposed in the thickness direction of the wall portion having the air intake port formed therein between the wall portion having the air intake port formed therein and the cabinet.

CITATION LIST

Patent Literature

PTL 1: JP 07-42949 A

SUMMARY OF INVENTION

Technical Problem

Unfortunately, it is desirable to reduce a space between an outer surface of a heating chamber and an inner surface of a cabinet to make a heating cooking apparatus compact.

In light of the above problem, an object of the present invention is to provide a heating cooking apparatus that can be made compact.

Solution to Problem

A heating cooking apparatus of the present invention includes a heating cooking chamber, a housing, an opening/closing portion, and a microwave supply unit. The heating cooking chamber includes a wall portion including a through hole. An object to be heated is accommodated in the heating cooking chamber. The housing accommodates the heating cooking chamber. The opening/closing portion is attached to the heating cooking chamber. The opening/closing portion opens or closes the through hole. The microwave supply unit supplies microwaves to an interior of the heating cooking chamber. The opening/closing portion includes a flowing portion, a cam, a drive unit, a lid portion, and a biasing portion. The flowing portion includes an opening facing the through hole. The flowing portion is attached to the wall portion. The flowing portion forms, between the flowing portion and the wall portion, an inner space through which air flows. The inner space is where the air flows. The cam fits into the opening. The drive unit rotates the cam. The lid portion is disposed in the inner space. The lid portion opens or closes the through hole in response to the rotation of the cam. The biasing portion biases the lid portion in a separation direction indicating a direction away from the through hole. The cam presses the lid portion against the biasing force of the biasing portion to cause the lid portion to close the through hole.

Advantageous Effects of Invention

According to the heating cooking apparatus of the present invention, it is possible to achieve compactness.

DESCRIPTION OF EMBODIMENTS

Figure 1:
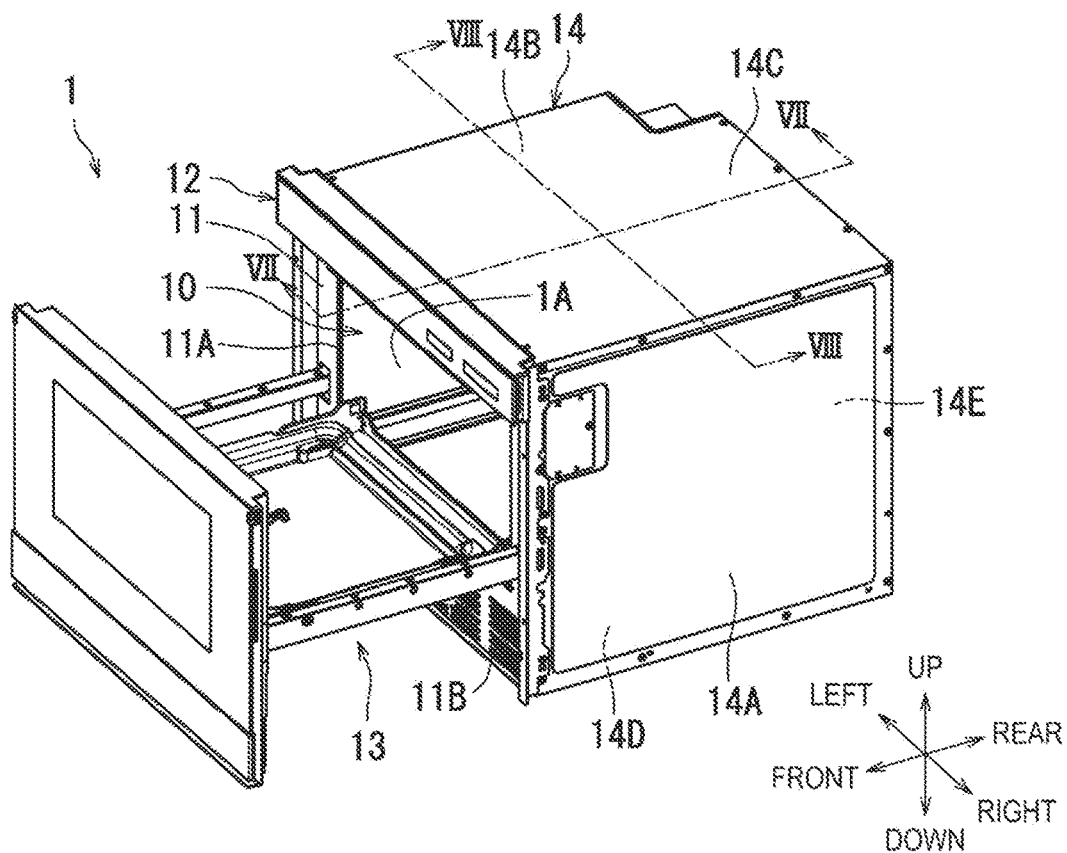
FIG. 1 is a perspective view of a heating cooking apparatus according to an embodiment of the present invention.

An embodiment of a heating cooking apparatus according to the present invention will be described below with reference to the drawings. Note that, in the drawings, the same or equivalent components are denoted by the same reference numerals and signs, and description thereof will not be repeated.

Figure 2:
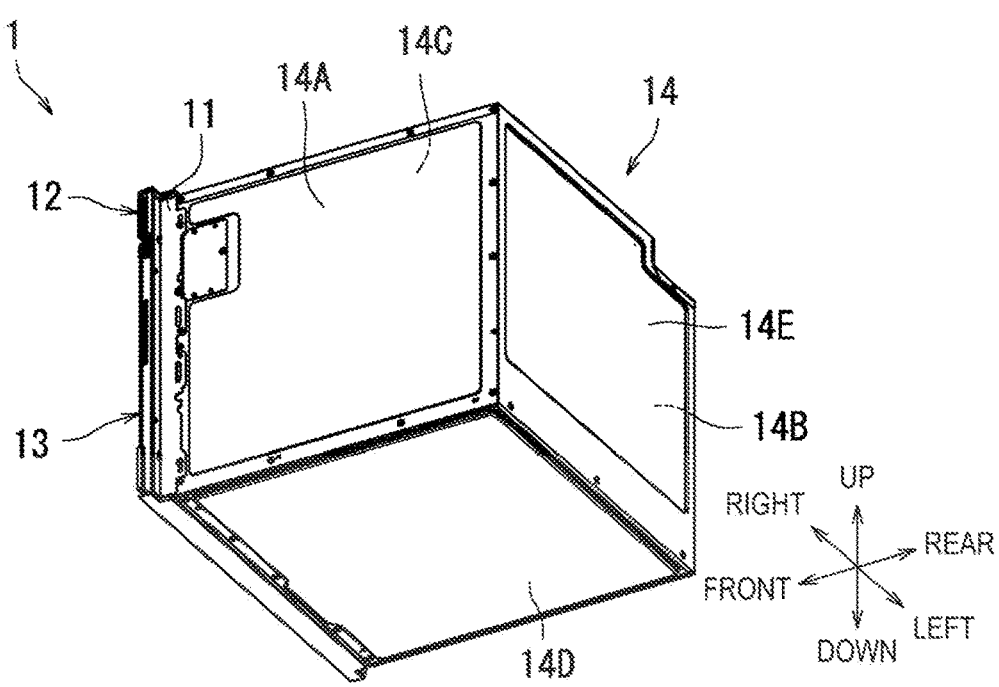
FIG. 2 is a perspective view of the heating cooking apparatus according to the embodiment of the present invention.

With reference to FIG. 1 and FIG. 2, a heating cooking apparatus 1 according to the present embodiment will be described. FIG. 1 and FIG. 2 are perspective views of the heating cooking apparatus 1 according to the present embodiment. Specifically, FIG. 1 illustrates the heating cooking apparatus 1 in an upper right diagonal direction from the front. FIG. 2 illustrates the heating cooking apparatus 1 in a lower right diagonal direction from behind.

The heating cooking apparatus 1 is used to heat and cook an object to be heated. The object to be heated is, for example, food. As illustrated in FIG. 1, the heating cooking apparatus 1 includes a heating cooking chamber 10, a panel 11, an operation panel unit 12, a pull-out body 13, and a housing 14.

In the present embodiment, a side on which the operation panel unit 12 of the heating cooking apparatus 1 is disposed is defined as a front side, and a side opposite thereto is defined as a rear side. Further, a right side as viewed from the front side of the heating cooking apparatus 1 is defined as a right side, and a side opposite thereto is defined as a left side. Further, a side on which the operation panel unit 12 is disposed in a direction orthogonal to a front-rear direction and a left-right direction of the heating cooking apparatus 1 is defined as an upper side, and a side opposite thereto is defined as a lower side. Note that these directions are not intended to limit the directions of the heating cooking apparatus according to the present invention when the heating cooking apparatus is used.

The heating cooking chamber 10 is a box-like member. The heating cooking chamber 10 includes an accommodation space 1A. The accommodation space 1A accommodates an object to be heated.

In the present embodiment, the heating cooking apparatus 1 includes, as heating cooking modes, a microwave heating mode, a first hot air circulation heating mode, a second hot air circulation heating mode, and a grill heating mode. The microwave heating mode is mainly a mode in which an object to be heated is heated and cooked through radiation of microwaves into the accommodation space 1A. The first hot air circulation heating mode is mainly a mode in which an object to be heated is heated and cooked by circulating first hot air H1 in the accommodation space 1A. The second hot air circulation heating mode mainly includes a first mode and a second mode. The first mode is a mode in which an object to be heated is heated and cooked by directly blowing second hot air H2 onto an upper surface of the object to be heated. The second mode is a mode in which the accommodation space 1A is preheated in a short time by circulating the second hot air H2 in the accommodation space 1A. The grill heating mode is mainly a mode in which an object to be heated is heated and cooked by exposing the object to be heated to heat radiation.

The panel 11 is disposed on the front side of the heating cooking chamber 10. The panel 11 includes an opening portion 11A. The opening portion 11A is located at a substantially center portion of the panel 11. The opening portion 11A has a rectangular shape. The opening portion 1A communicates with the accommodation space 1A. Details of the panel 11 will be described below with reference to FIG. 6.

The operation panel unit 12 receives operation from a user. The operation panel unit 12 is disposed further forward than the panel 11. In other words, the operation panel unit 12 is disposed in front of the heating cooking chamber 10. The operation panel unit 12 is located at an upper portion of the heating cooking apparatus 1.

The pull-out body 13 can be pulled out freely relative to the heating cooking chamber 10 in the front-rear direction. More specifically, the pull-out body 13 is pulled out in the front direction of the heating cooking chamber 10. The pull-out body 13 is located below the operation panel unit 12. Details of the configuration of the pull-out body 13 will be described below with reference to FIG. 3 and FIG. 4.

The housing 14 accommodates the heating cooking chamber 10. The housing 14 is an object having a rectangular parallelepiped shape with an open front side. As illustrated in FIG. 2, the housing 14 includes a right wall 14A, a left wall 14B, an upper wall 14C, a lower wall 14D, and a rear wall 14E.

Figure 3:
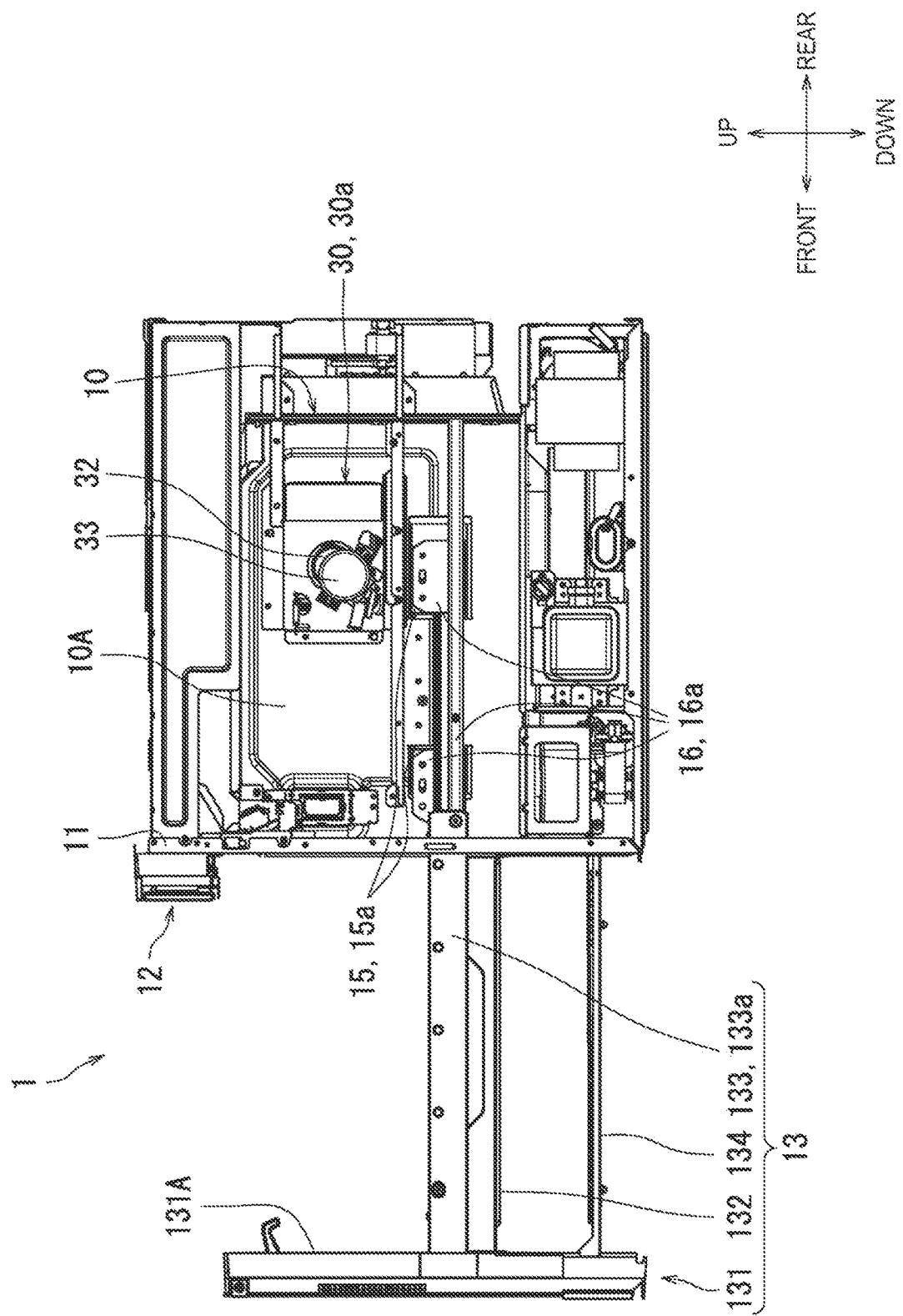
FIG. 3 is a diagram illustrating a right side surface of the heating cooking apparatus according to the embodiment of the present invention.
Figure 4:
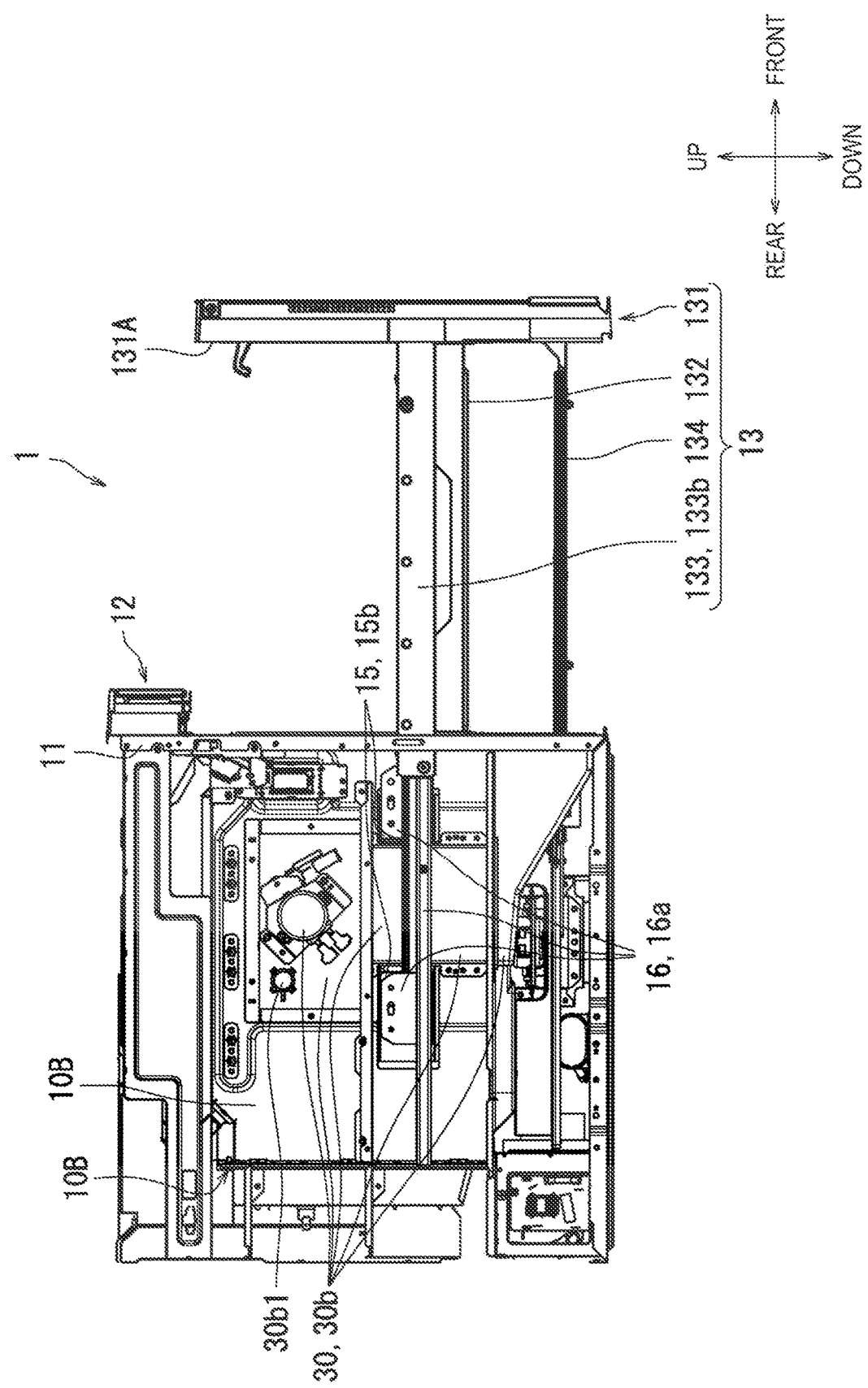
FIG. 4 is a diagram illustrating a left side surface of the heating cooking apparatus according to the embodiment of the present invention.
Figure 5:
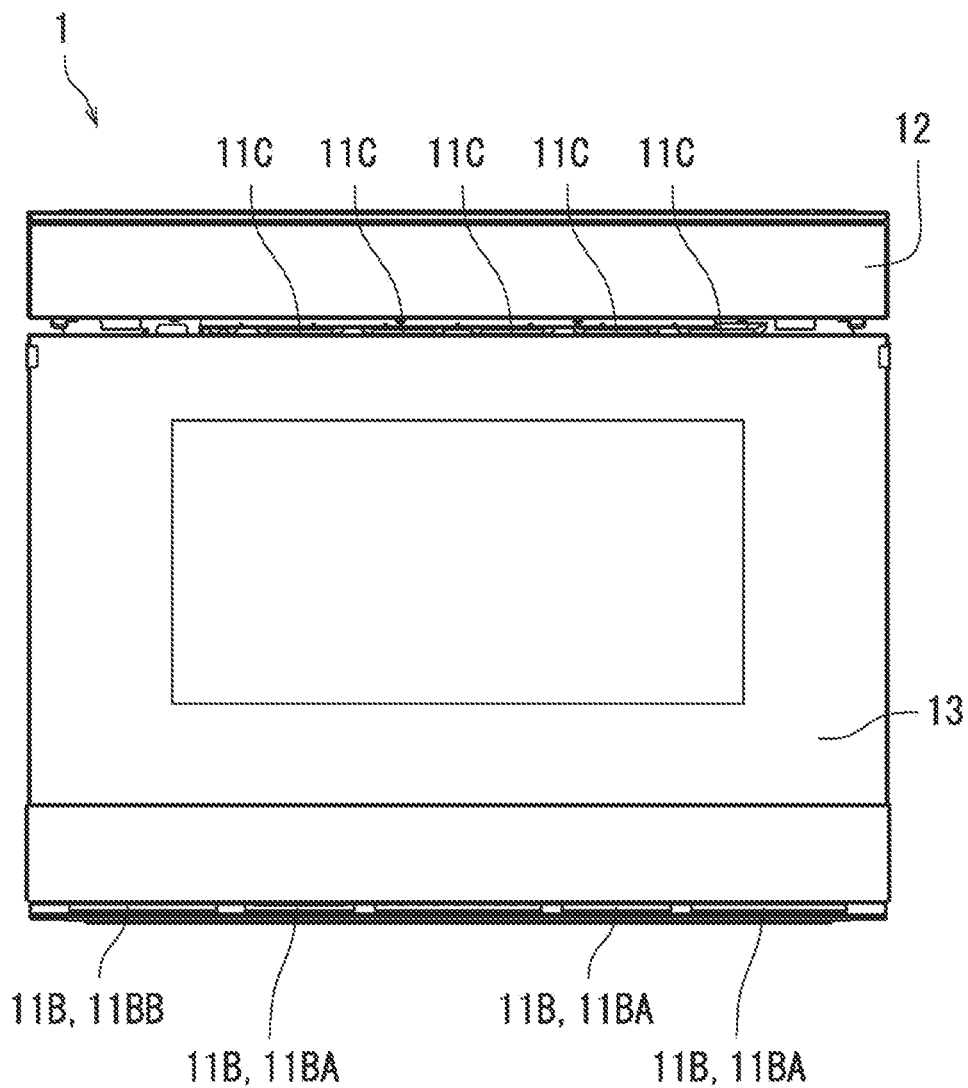
FIG. 5 is a front view of the heating cooking apparatus according to the embodiment of the present invention.
Figure 5:
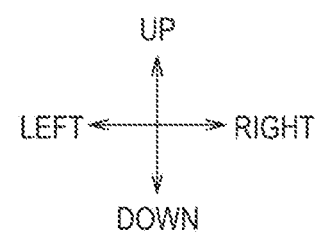

Next, the pull-out body 13 will be further described with reference to FIG. 1 to FIG. 5. FIG. 3 is a diagram illustrating a right side surface of the heating cooking apparatus 1 according to the present embodiment. Specifically, FIG. 3 illustrates the right side surface of the heating cooking apparatus 1 in a state where the housing 14 is removed. FIG. 4 is a diagram illustrating a left side surface of the heating cooking apparatus 1 according to the present embodiment. Specifically, FIG. 4 illustrates the left side surface of the heating cooking apparatus 1 in a state where the housing 14 is removed. FIG. 5 is a front view of the heating cooking apparatus 1 according to the present embodiment.

As illustrated in FIG. 3 and FIG. 4, the pull-out body 13 includes a door portion 131, a placing portion 132, a pair of left and right slide members 133, and a support member 134.

The door portion 131 can open and close the opening portion 11A of the panel 11. As illustrated in FIG. 5, the door portion 131 is a substantially rectangular plate-like member.

An object to be heated can be placed on the placing portion 132. As illustrated in FIG. 3 and FIG. 4, the door portion 131 has a rear surface 131A. The placing portion 132 is attached to the rear surface 131A of the door portion 131.

The pair of left and right slide members 133 supports the door portion 131. The pair of left and right slide members 133 supports the placing portion 132 by supporting the door portion 131. The pair of left and right slide members 133 is attached to the rear surface 131A of the door portion 131. Each of the pair of left and right slide members 133 includes a right slide member 133a (see FIG. 3) with the front-rear direction as a longitudinal direction, and a left slide member 133b (see FIG. 4) with the front-rear direction as a longitudinal direction.

The support member 134 supports the door portion 131. The support member 134 supports the placing portion 132 by supporting the door portion 131. The support member 134 is attached at a substantially center portion of the rear surface 131A of the door portion 131 in the left-right direction, and below the placing portion 132. The support member 134 is a plate-like member with the front-rear direction as a longitudinal direction. The support member 134 includes a rack portion. The rack portion includes a plurality of teeth. The heating cooking apparatus 1 includes a drive mechanism 25 to be described below with reference to FIG. 31. The drive mechanism 25 is accommodated in an air intake space AR to be described below with reference to FIG. 8. The drive mechanism 25 causes the pull-out body 13 to be in an opened state or a closed state by engaging with the rack portion of the support member 134. The opened state of the pull-out body 13 is a state where the placing portion 132 of the pull-out body 13 is pulled out from the accommodation space 1A. The closed state of the pull-out body 13 is a state where the placing portion 132 of the pull-out body 13 is pulled into the accommodation space 1A.

Figure 6:
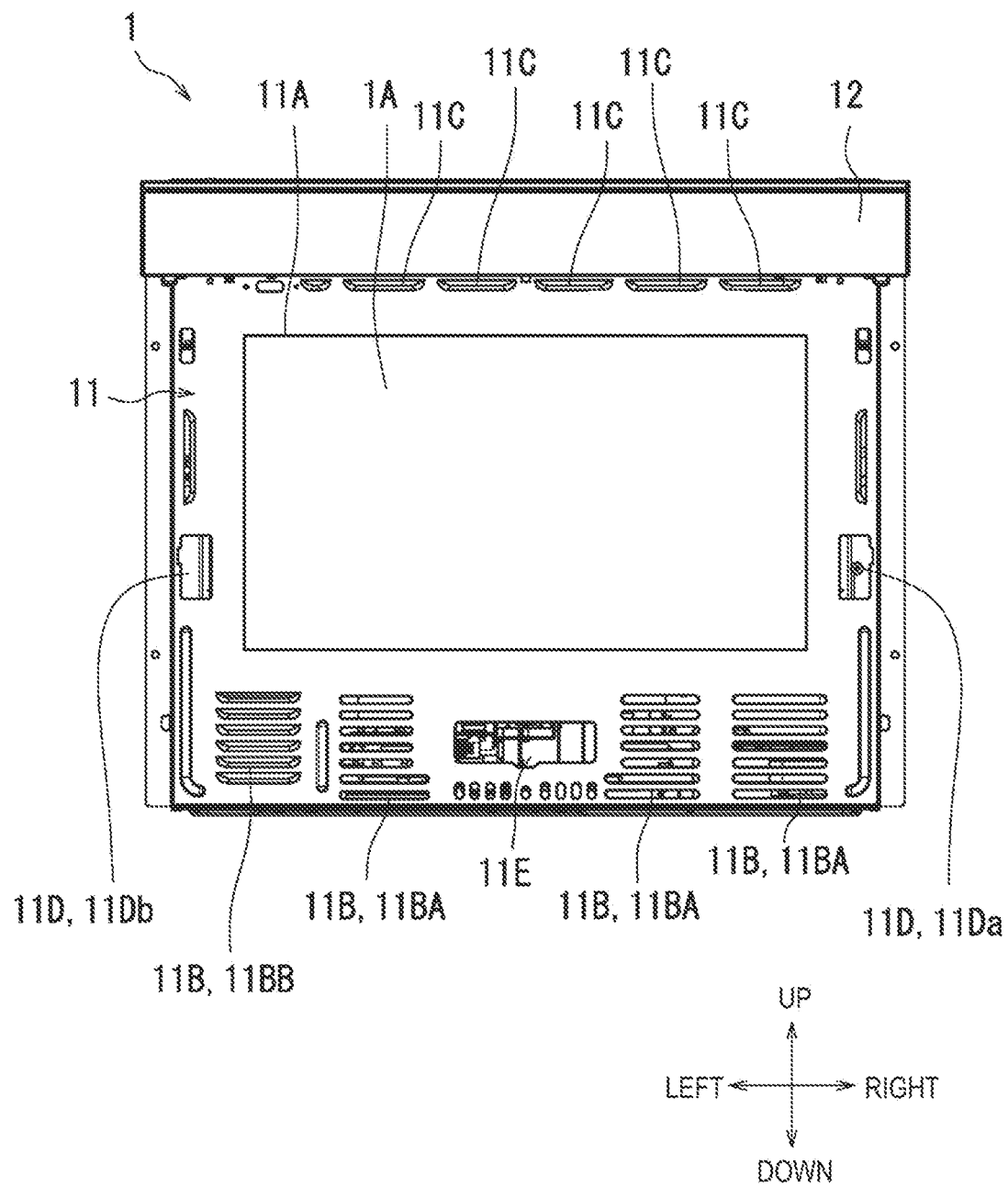
FIG. 6 is a front view of the heating cooking apparatus according to the embodiment of the present invention.

Next, the panel 11 will be further described with reference to FIG. 1 to FIG. 6. FIG. 6 is a front view of the heating cooking apparatus 1 according to the present embodiment. Specifically, FIG. 6 illustrates the heating cooking apparatus 1 in a state where the pull-out body 13 is removed.

As illustrated in FIG. 6, the panel 11 is a rectangular plate-like member. The panel 11 includes a plurality of first through hole portions 11B, a plurality of second through hole portions 11C, a pair of third through hole portions 11D, and a fourth through hole portion 11E, in addition to the opening portion 11A. Hereinafter, the plurality of second through hole portions 11C will be collectively referred to as an "exhaust hole portion 11C".

The plurality of first through hole portions 11B are located at a portion below the opening portion 11A of the panel 11. The plurality of first through hole portions 11B form four columns. In the present embodiment, each of the four columns is composed of six or seven first through hole portions 11B disposed in a row along an up-down direction. Two columns of the four columns are located at a portion proximate to a right end of the panel 11. The other two columns of the four columns are located at a portion proximate to a left end of the panel 11. Hereinafter, the seven first through hole portions 11B constituting each column except for the leftmost column among the four columns may be collectively referred to as an "air intake hole portion 11BA". Hereinafter, the six first through hole portions 11B constituting the leftmost column among the four columns may be collectively referred to as an "exhaust hole portion 11BB". The air intake hole portion 11BA communicates a first space R to be described below with reference to FIG. 7 and the outside of the heating cooking apparatus 1 with each other. The air intake hole portion 11BA is located upstream of a blown air flow F that is blown out by a cooling fan 40 to be described below with reference to FIG. 9 and FIG. 10.

The exhaust hole portion 11C communicates the first space R to be described below with reference to FIG. 7 and the outside of the heating cooking apparatus 1 with each other. The exhaust hole portion 11C is located downstream of the blown air flow F that is blown out by the cooling fan 40 to be described below with reference to FIG. 9. Further, the exhaust hole portion 11C is located on the panel 11 at a portion above the opening portion 11A. The plurality of second through hole portions 11C are disposed in a row from a right portion to a left portion of the panel 11. Further, as illustrated in FIG. 5, the exhaust hole portion 11C is located between the pull-out body 13 and the operation panel unit 12 in the up-down direction.

As illustrated in FIG. 6, the pair of third through hole portions 11D include a right through hole portion 11Da and a left through hole portion 11Db. The right through hole portion 11Da is located on the panel 11 at a portion to the right of the opening portion 11A. The left through hole portion 11Db is located on the panel 11 at a portion to the left of the opening portion 11A. The right slide member 133a passes through the right through hole portion 11Da of the panel 11. The left slide member 133b passes through the left through hole portion 11Db of the panel 11.

The fourth through hole portion 11E is located on the panel 11 at a portion below the opening portion 11A of the panel 11 and at a substantially center portion of the panel 11 in the left-right direction. The support member 134 passes through the fourth through hole portion 11E of the panel 11.

Next, a configuration of the heating cooking apparatus 1 will be further described with reference to FIG. 1 to FIG. 6.

As illustrated in FIG. 3 and FIG. 4, the heating cooking apparatus 1 further includes a pair of left and right support portions 15 and a pair of left and right slide rails 16.

The pair of left and right support portions 15 support the pair of left and right slide rails 16. The pair of left and right support portions 15 include a right support portion 15a (see FIG. 3) and a left support portion 15b (see FIG. 4). As illustrated in FIG. 3, the heating cooking chamber 10 includes a right wall 10A. The right support portion 15a is attached to the right wall 10A of the heating cooking chamber 10. As illustrated in FIG. 4, the heating cooking chamber 10 includes a left wall 10B. The left support portion 15b is attached to the left wall 10B of the heating cooking chamber 10. The right wall 10A and the left wall 10B are examples of wall portions.

The pair of left and right slide rails 16 slidably support the pull-out body 13 in the front-rear direction. As illustrated in FIG. 3 and FIG. 4, the pair of left and right slide rails 16 include a right slide rail 16a (see FIG. 3) and a left slide rail 16b (see FIG. 4). The right slide rail 16a and the left slide rail 16b are attached to an outer surface of the heating cooking chamber 10. Specifically, as illustrated in FIG. 3, the right slide rail 16a is attached to the right support portion 15a. As illustrated in FIG. 4, the left slide rail 16b is attached to the left support portion 15b. Each of the right slide rail 16a and the left slide rail 16b includes a plate-shaped portion with the front-rear direction as a longitudinal direction. The plate-shaped portion of the right slide rail 16a engages with the right slide member 133a. The right slide member 133a is slidably supported by the right slide rail 16a. The plate-shaped portion of the left slide rail 16b engages with the left slide member 133b. The left slide member 133b is slidably supported by the left slide rail 16b.

Next, the configuration of the heating cooking apparatus 1 according to the present embodiment will be further described with reference to FIG. 1 to FIG. 8. FIG. 7 is a cross-sectional view of the heating cooking apparatus 1 along a section line VII in FIG. 1. FIG. 8 is a cross-sectional view of the heating cooking apparatus 1 along a section line VIII in FIG. 1.

Figure 7:
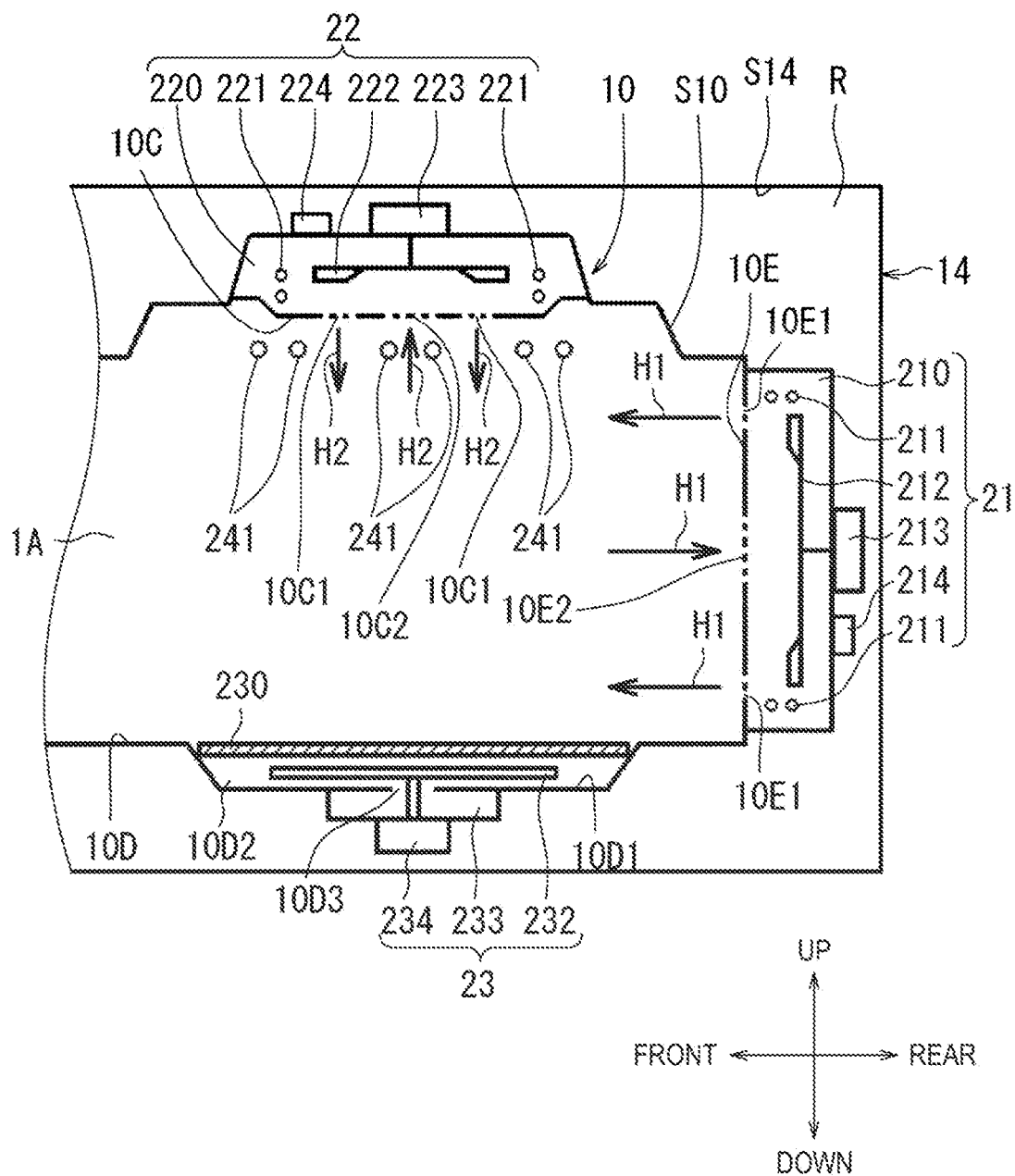
FIG. 7 is a cross-sectional view of the heating cooking apparatus along a section line VII in FIG. 1.
Figure 8:
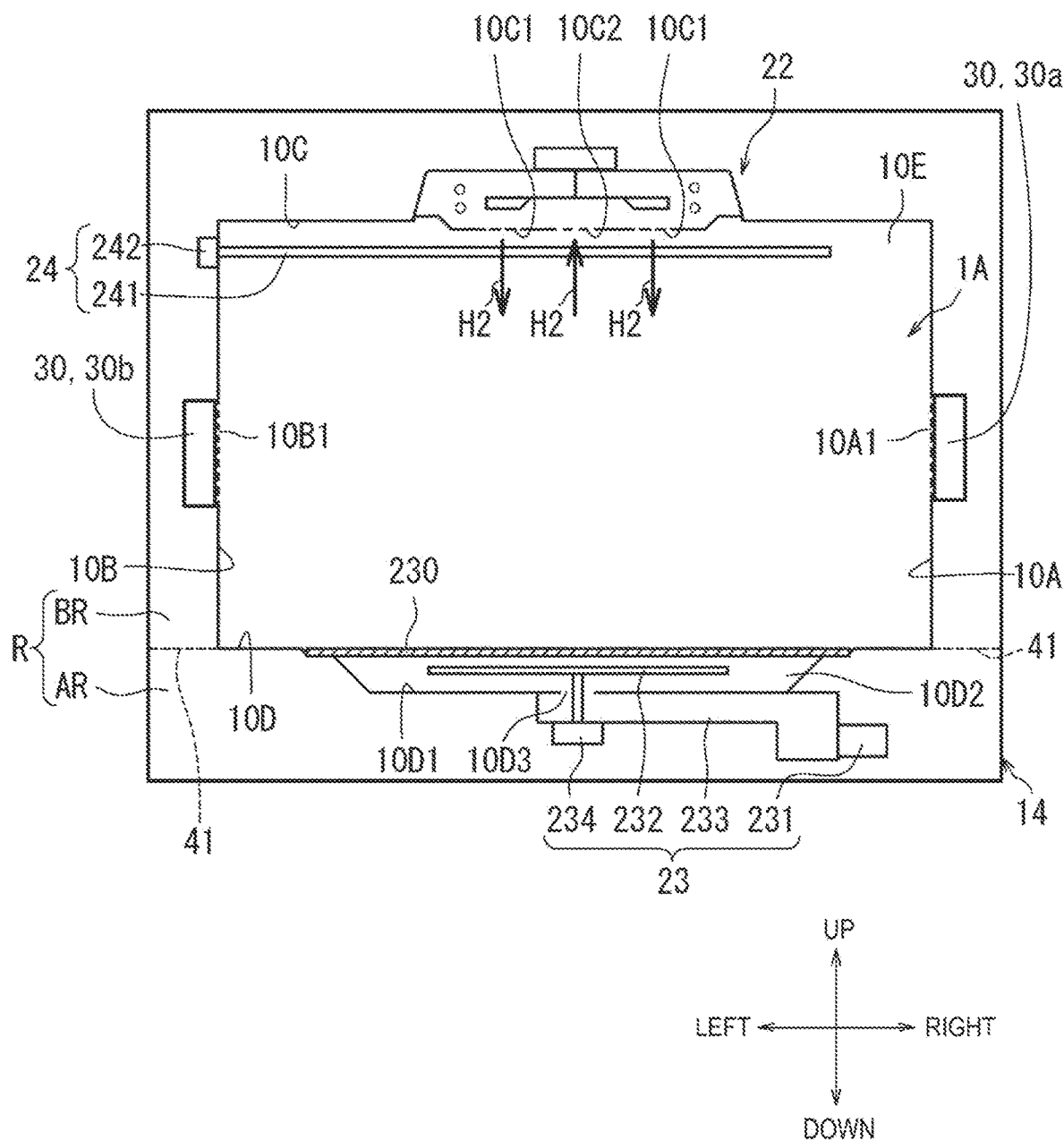
FIG. 8 is a cross-sectional view of the heating cooking apparatus along a section line VIII in FIG. 1.

As illustrated in FIG. 7, the heating cooking chamber 10 includes an upper wall 10C, a lower wall 10D, and a rear wall 10E, in addition to the right wall 10A and the left wall 10B. The accommodation space 1A is formed by the right wall 10A, the left wall 10B, the upper wall 10C, the lower wall 10D, and the rear wall 10E. The accommodation space 1A of the heating cooking chamber 10 has a substantially rectangular parallelepiped shape.

The heating cooking apparatus 1 further includes a first air sending unit 21, a second air sending unit 22, a microwave supply unit 23, a grill unit 24 (see FIG. 8), and a damper unit 30 (see FIG. 8). The heating cooking apparatus 1 includes the first space R. The first space R is formed between an outer surface S10 of the heating cooking chamber 10 and an inner surface S14 of the housing 14.

The first air sending unit 21 supplies the first hot air H1 into the accommodation space 1A. In other words, the first air sending unit 21 executes the first hot air circulation heating mode. The first air sending unit 21 is attached to an outer side of the rear wall 10E. The rear wall 10E includes a plurality of first blow-out hole portions 10E1 and a plurality of first intake hole portions 10E2. The plurality of first intake hole portions 10E2 are located at a substantially center portion of the rear wall 10E. The plurality of first blow-out hole portions 10E1 are located on the rear wall 10E at an outer portion of the plurality of first intake hole portions 10E2 in the rear wall 10E.

The first air sending unit 21 includes a first air sending chamber 210, a first heater 211, a first centrifugal fan 212, a first drive unit 213, and a first energization unit 214. The first heater 211 and the first centrifugal fan 212 are accommodated in the first air sending chamber 210. The first drive unit 213 and the first energization unit 214 are located outside the first air sending chamber 210. The first energization unit 214 energizes the first heater 211. The energized first heater 211 heats air in the first air sending chamber 210. The first drive unit 213 drives the first centrifugal fan 212. The driven first centrifugal fan 212 blows air in the first air sending chamber 210 into the accommodation space 1A through the plurality of first blow-out hole portions 10E1. Further, the driven first centrifugal fan 212 draws the air in the accommodation space 1A into the first air sending chamber 210 through the plurality of first intake hole portions 10E2. The plurality of first intake hole portions 10E2 face the first centrifugal fan 212 in an axial direction of the first centrifugal fan 212. The first heater 211 is, for example, a sheathed heater. The first drive unit 213 is, for example, a motor.

The second air sending unit 22 supplies the second hot air H2 into the accommodation space 1A. In other words, the second air sending unit 22 executes the second hot air circulation heating mode. The second air sending unit 22 is attached to an outer side of the upper wall 10C. The upper wall 10C includes a plurality of second blow-out hole portions 10C1 and a plurality of second intake hole portions 10C2. The plurality of second blow-out hole portions 10C1 and the plurality of second intake hole portions 10C2 are located at a substantially center portion of the upper wall 10C.

The second air sending unit 22 includes a second air sending chamber 220, a second heater 221, a second centrifugal fan 222, a second drive unit 223, and a second energization unit 224. The second heater 221 and the second centrifugal fan 222 are accommodated in the second air sending chamber 220. The second drive unit 223 and the second energization unit 224 are located outside the second air sending chamber 220. The second energization unit 224 energizes the second heater 221. The energized second heater 221 heats air in the second air sending chamber 220. The second drive unit 223 drives the second centrifugal fan 222. The driven second centrifugal fan 222 blows air in the second air sending chamber 220 into the accommodation space 1A through the plurality of second blow-out hole portions 10C1. Further, the driven second centrifugal fan 222 draws air in the accommodation space 1A into the second air sending chamber 220 through the plurality of second intake hole portions 10C2. The plurality of second intake hole portions 10C2 face the second centrifugal fan 222 in an axial direction of the second centrifugal fan 222. The second heater 221 is, for example, a sheathed heater. The second drive unit 223 is, for example, a motor.

The microwave supply unit 23 supplies microwaves into the accommodation space 1A. In other words, the microwave supply unit 23 executes the microwave heating mode. The microwave supply unit 23 is attached to the lower wall 10D.

As illustrated in FIG. 8, the microwave supply unit 23 includes a magnetron 231, a rotary antenna 232, a waveguide 233, and an antenna motor 234. The lower wall 10D includes a recessed portion 10D1. The recessed portion 10D1 is located at a substantially center portion of the lower wall 10D. The heating cooking chamber 10 includes an oven tray 230. The oven tray 230 is attached to the lower wall 10D. The oven tray 230 is a plate-like member. The oven tray 230 covers the recessed portion 10D1. The oven tray 230 and the recessed portion 10D1 form a space 10D2 therebetween. The rotary antenna 232 is located in the space 10D2. The magnetron 231, the waveguide 233, and the antenna motor 234 are located outside the recessed portion 10D1. The magnetron 231 generates microwaves. The recessed portion 10D1 includes a power supply hole portion 10D3. The waveguide 233 propagates the generated microwaves to the power supply hole portion 10D3. As a result, the microwaves are supplied into the accommodation space 1A via the rotary antenna 232. The antenna motor 234 drives the rotary antenna 232. The rotary antenna 232 agitates the microwaves and radiates the microwaves into the accommodation space 1A.

The material of the oven tray 230 includes ceramic or glass. Because the material of the oven tray 230 includes ceramic or glass, the oven tray 230 facilitates transmission of the microwaves. Therefore, when the microwave heating mode is executed, the microwaves are supplied from the recessed portion 10D1, and the heating cooking apparatus 1 can efficiently heat and cook an object to be heated.

The grill unit 24 supplies heat into the accommodation space 1A. The grill unit 24 executes the grill heating mode. The grill unit 24 includes a heating cooking heater unit 241 and a third energization unit 242. The heating cooking heater unit 241 is located at an upper portion in the accommodation space 1A. The third energization unit 242 is located outside the left wall 10B. The third energization unit 242 projects from the outer surface of the left wall 10B of the heating cooking chamber 10. The third energization unit 242 energizes the heating cooking heater unit 241. The energized heating cooking heater unit 241 generates and radiates heat. The heating cooking heater unit 241 is, for example, a U-shaped sheathed heater. The third energization unit 242 of the grill unit 24 generates heat by the drive of the grill unit 24.

The right wall 10A includes a plurality of air supply hole portions 10A1. The plurality of air supply hole portions 10A1 pass through the right wall 10A. The left wall 10B includes a plurality of exhaust hole portions 10B1. The plurality of exhaust hole portions 10B1 pass through the left wall 10B. The plurality of air supply hole portions 10A1 and the plurality of exhaust hole portions 10B1 are examples of through holes.

The damper unit 30 opens or closes the plurality of air supply hole portions 10A1 and the plurality of exhaust hole portions 10B1. For example, when the damper unit 30 opens the plurality of air supply hole portions 10A1 and the plurality of exhaust hole portions 10B1, the accommodation space 1A communicates with the first space R. When the damper unit 30 closes the plurality of air supply hole portions 10A1 and the plurality of exhaust hole portions 10B1, the accommodation space 1A does not communicate with the first space R. The damper unit 30 includes an air supply damper 30a and an exhaust damper 30b. The damper unit 30 is an example of an opening/closing portion.

The air supply damper 30a opens or closes the plurality of air supply hole portions 10A1. The air supply damper 30a is attached to the outer side of the right wall 10A. The configuration of the air supply damper 30a will be described below with reference to FIG. 11 to FIG. 24.

The exhaust damper 30b opens or closes the plurality of exhaust hole portions 10B1. The exhaust damper 30b is attached to the outer side of the left wall 10B. As illustrated in FIG. 4, the exhaust damper 30b includes a humidity sensor 30b1. The humidity sensor 30b1 detects the amount of vapor included in the air discharged from the accommodation space 1A through the plurality of exhaust hole portions 10B1 when the plurality of exhaust hole portions 10B1 are opened. Accordingly, when the microwave heating mode is executed, the heating cooking apparatus 1 can detect a finish of the object to be heated that has been heated and cooked based on the amount of vapor detected by the humidity sensor 30b1. The exhaust damper 30b guides the air discharged from the accommodation space 1A through the plurality of exhaust hole portions 10B1 to the exhaust hole portion 11BB without bringing the air into contact with the air in the first space R.

Figure 9:
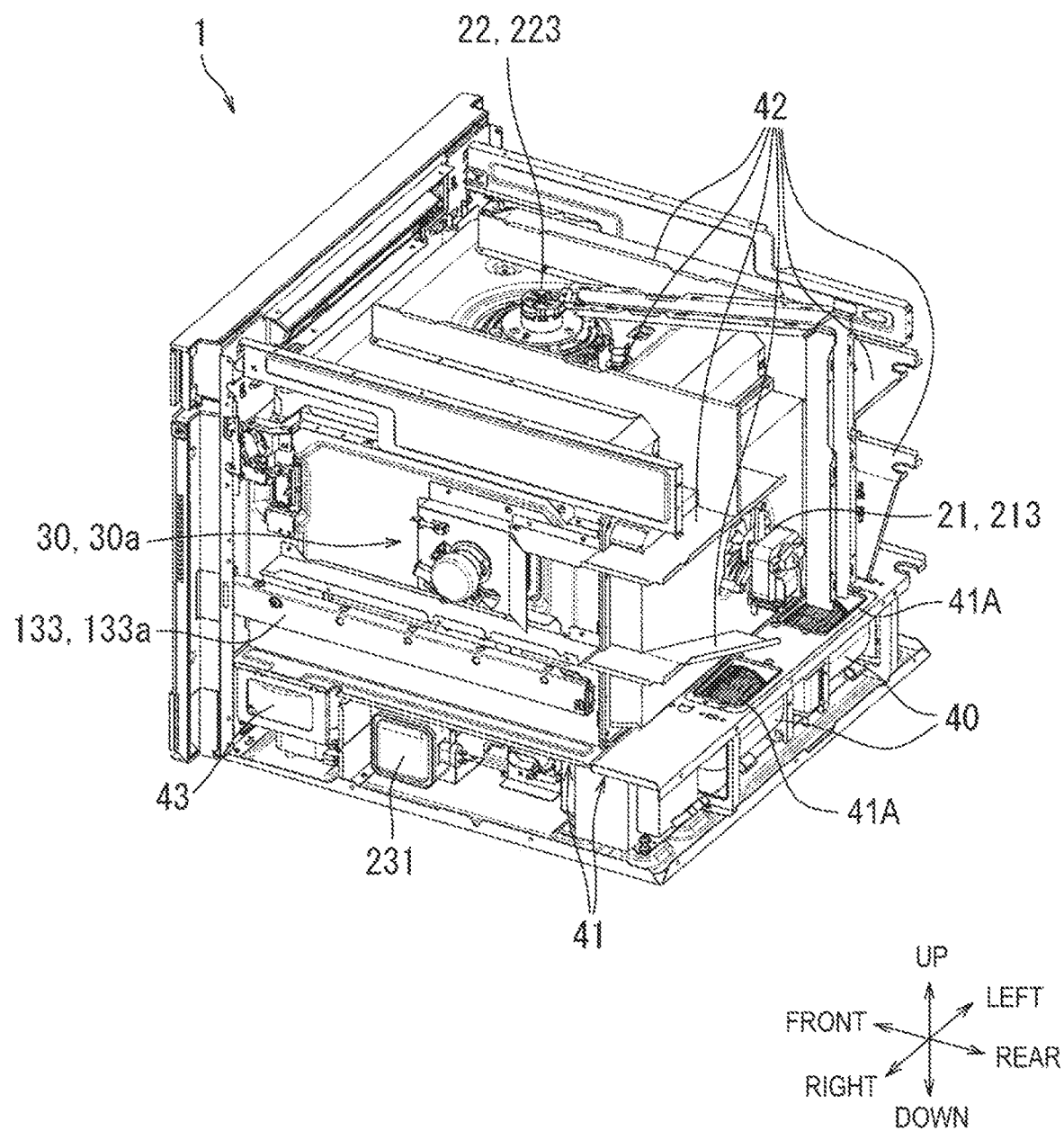
FIG. 9 is a perspective view of the heating cooking apparatus according to the embodiment of the present invention.
Figure 10:
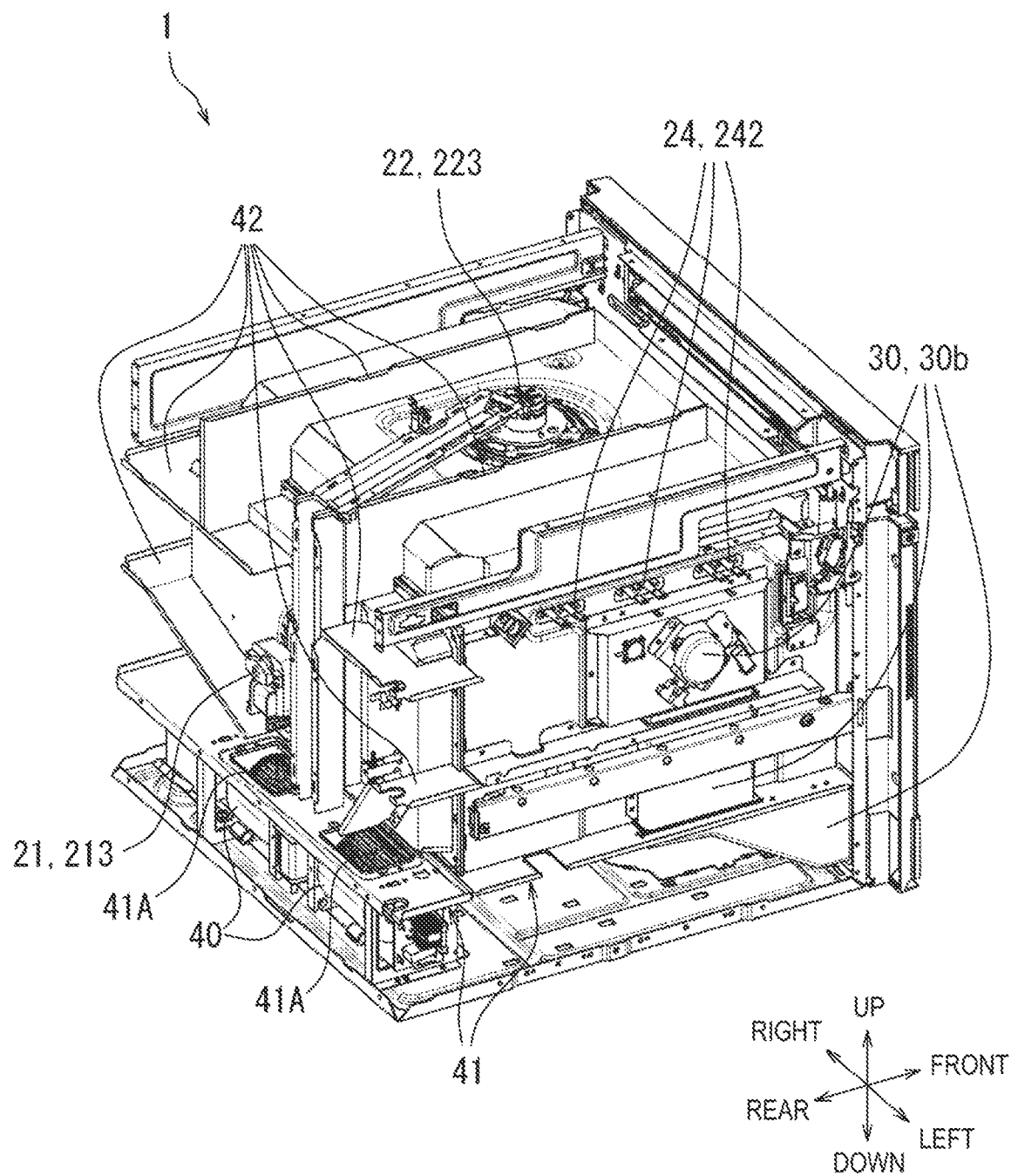
FIG. 10 is a perspective view of the heating cooking apparatus according to the embodiment of the present invention.

Next, the configuration of the heating cooking apparatus 1 will be further described with reference to FIG. 8 to FIG. 10. FIG. 9 is a perspective view of the heating cooking apparatus 1 according to the present embodiment. Specifically, FIG. 9 illustrates the heating cooking apparatus 1 in a state where the housing 14 is removed in an upper right diagonal direction from behind. FIG. 10 is a perspective view of the heating cooking apparatus 1 according to the present embodiment. Specifically. FIG. 10 illustrates the heating cooking apparatus 1 in a state where the housing 14 is removed in an upper left diagonal direction from behind.

As illustrated in FIG. 9 and FIG. 10, the heating cooking apparatus 1 further includes the cooling fan 40, a partition plate 41, a plurality of air deflecting plates 42, and a magnetron fan 43. The cooling fan 40, the partition plate 41, the plurality of air deflecting plates 42, and the magnetron fan 43 are located in the first space R.

The cooling fan 40 mainly cools components to be cooled that are disposed around the outer surface of the heating cooking chamber 10. The components to be cooled include the pair of left and right slide members 133, the pair of left and right slide rails 16, the first air sending unit 21, the second air sending unit 22, and the grill unit 24. Specifically, the cooling fan 40 takes air outside of the heating cooking apparatus 1 into the first space R and discharges air in the first space R to the outside of the heating cooking apparatus 1. As illustrated in FIG. 9, the cooling fan 40 is located at a lower and rear portion of the first space R. In the present embodiment, the cooling fan 40 is a cross-flow fan.

As illustrated in FIG. 8, the partition plate 41 partitions the first space R into an air intake space AR and an exhaust space BR. The air intake space AR is located below the partition plate 41 in the first space R in the up-down direction. The exhaust space BR is located above the partition plate 41 in the first space R in the up-down direction. In the air intake space AR, an intake air flow generated by the drive of the cooling fan 40 flows. The intake air flow indicates a flow of air that flows from the outside of the heating cooking apparatus 1 toward the cooling fan 40 through the plurality of air intake hole portions 11BA. In the exhaust space BR, a blown air flow F generated by the drive of the cooling fan 40 flows. As illustrated in FIG. 9 and FIG. 10, the partition plate 41 includes two blow-out hole portions 41A. The blown air flow F is blown upward from the cooling fan 40 through two blow-out hole portions 41A of the partition plate 41 and indicates a flow of air toward the exhaust hole portion 11C.

The partition plate 41 is located at a portion above the cooling fan 40 in the first space R and a portion below the pair of left and right slide rails 16. The partition plate 41 is attached to the outer surface of the heating cooking chamber 10 across a front end portion of the right wall 10A of the heating cooking chamber 10 to a front end portion of the left wall 10B of the heating cooking chamber 10. The partition plate 41 is in contact with the inner surface of each of the right wall 14A, the rear wall 14E, and the left wall 14B of the housing 14.

In the present embodiment, the magnetron 231 of the microwave supply unit 23 is located in the air intake space AR. The pair of left and right slide rails 16, the first air sending unit 21, the second air sending unit 22, the third energization unit 242 of the grill unit 24, and the damper unit 30 are located in the exhaust space BR.

The plurality of air deflecting plates 42 branch the blown air flow F that is blown out by the cooling fan 40 in an upward direction, guide the blown air flow F to the components to be cooled, and split the blown air flow F into an air flow sufficient to cool each of the components to be cooled. Specifically, the plurality of air deflecting plates 42 function as a duct that branches the blown air flow F and guides the blown air flow to each of the right slide rail 16a, the left slide rail 16b, the air supply damper 30a, the grill unit 24, the first air sending unit 21, and the second air sending unit 22. The plurality of air deflecting plates 42 are attached to an outer surface of the rear wall 10E of the heating cooking chamber 10.

The magnetron fan 43 cools the magnetron 231 of the microwave supply unit 23. Specifically, the magnetron fan 43 suctions air outside of the heating cooking apparatus 1 through the plurality of air intake hole portions 11BA described with reference to FIG. 6 and blows the air onto the magnetron 231. The operation characteristics of the magnetron 231 depend on the temperature of the magnetron 231. Thus, the magnetron fan 43 inhibits fluctuations in the operation characteristics of the magnetron 231. As illustrated in FIG. 9, the magnetron fan 43 is located below the heating cooking chamber 10 and in front of the magnetron 231. The magnetron fan 43 is, for example, a sirocco fan.

Figure 11:
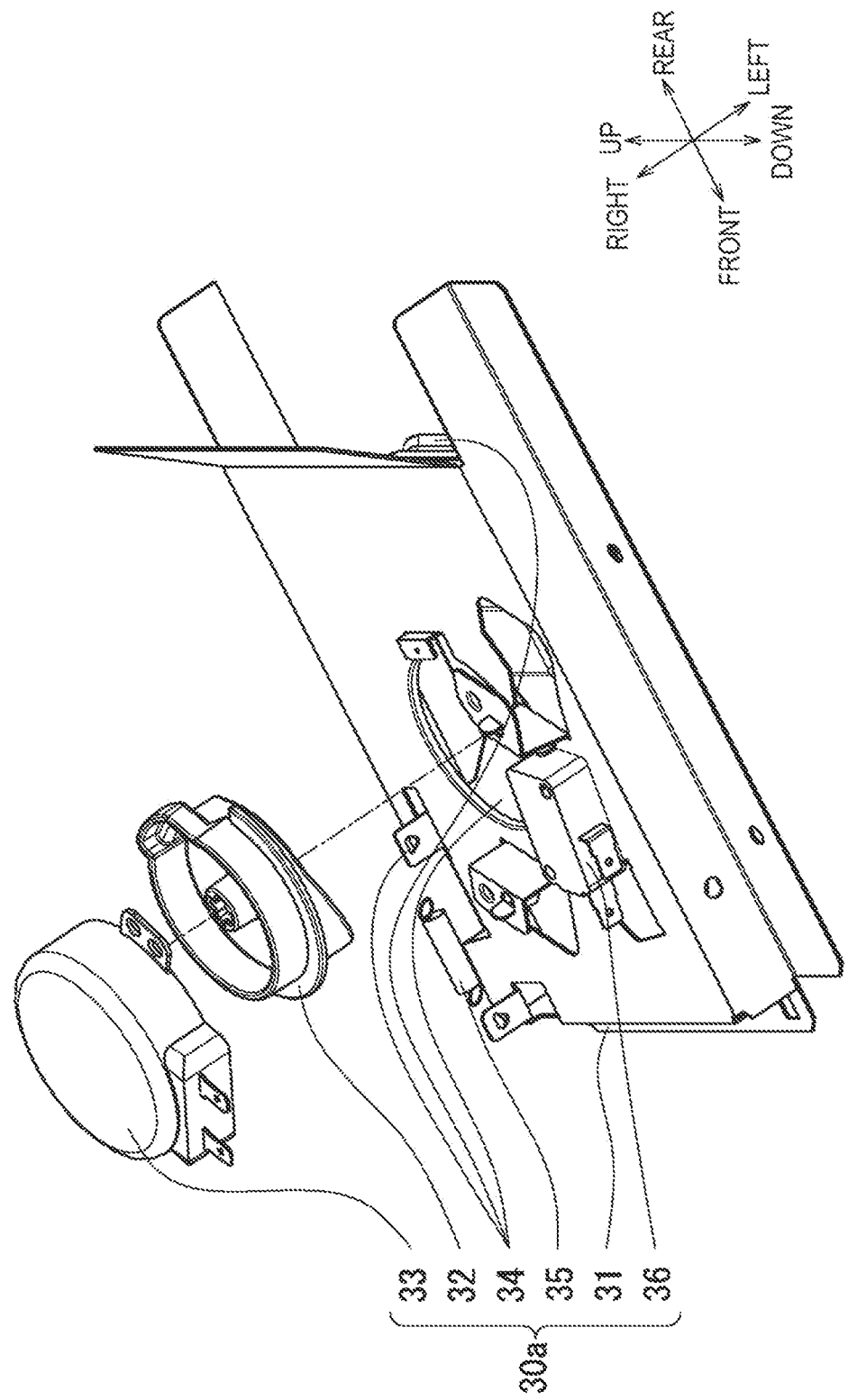
FIG. 11 is a disassembled perspective view of an air supply damper according to the embodiment of the present invention.

Next, the configuration of the air supply damper 30a will be further described with reference to FIG. 11 to FIG. 24. First, components of the air supply damper 30a will be described with reference to FIG. 11. FIG. 11 is a disassembled perspective view of the air supply damper 30a according to the present embodiment.

As illustrated in FIG. 11, the air supply damper 30a includes a flowing portion 31, a cam 32, a drive unit 33, a lid portion 34, a tension spring 35, and a limit switch 36. The tension spring 35 is an example of a biasing portion. The limit switch 36 is an example of a position detection unit. Details of the components of the air supply damper 30a will be described below.

Figure 12:
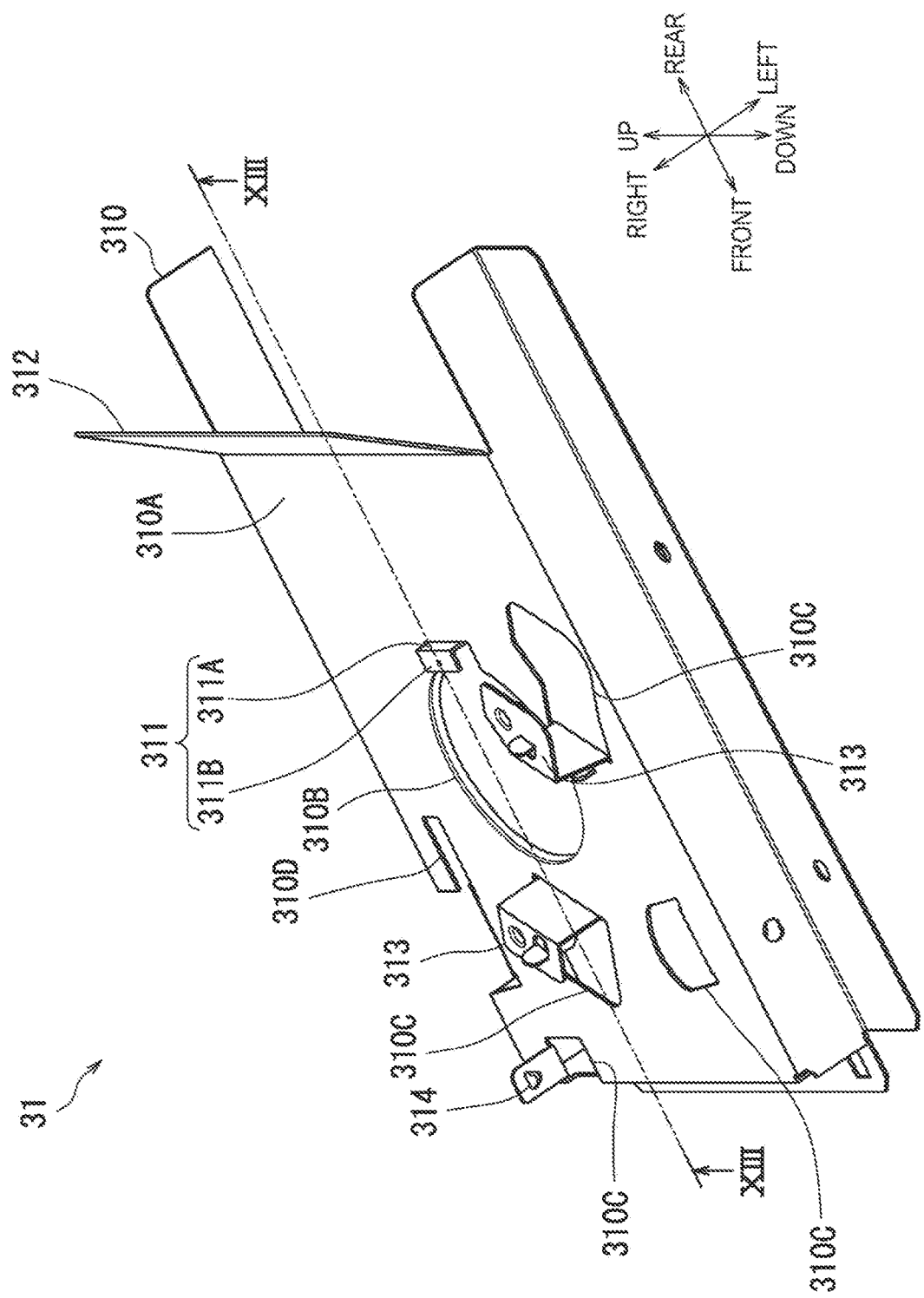
FIG. 12 is a perspective view of a flowing portion according to the embodiment of the present invention.
Figure 13:
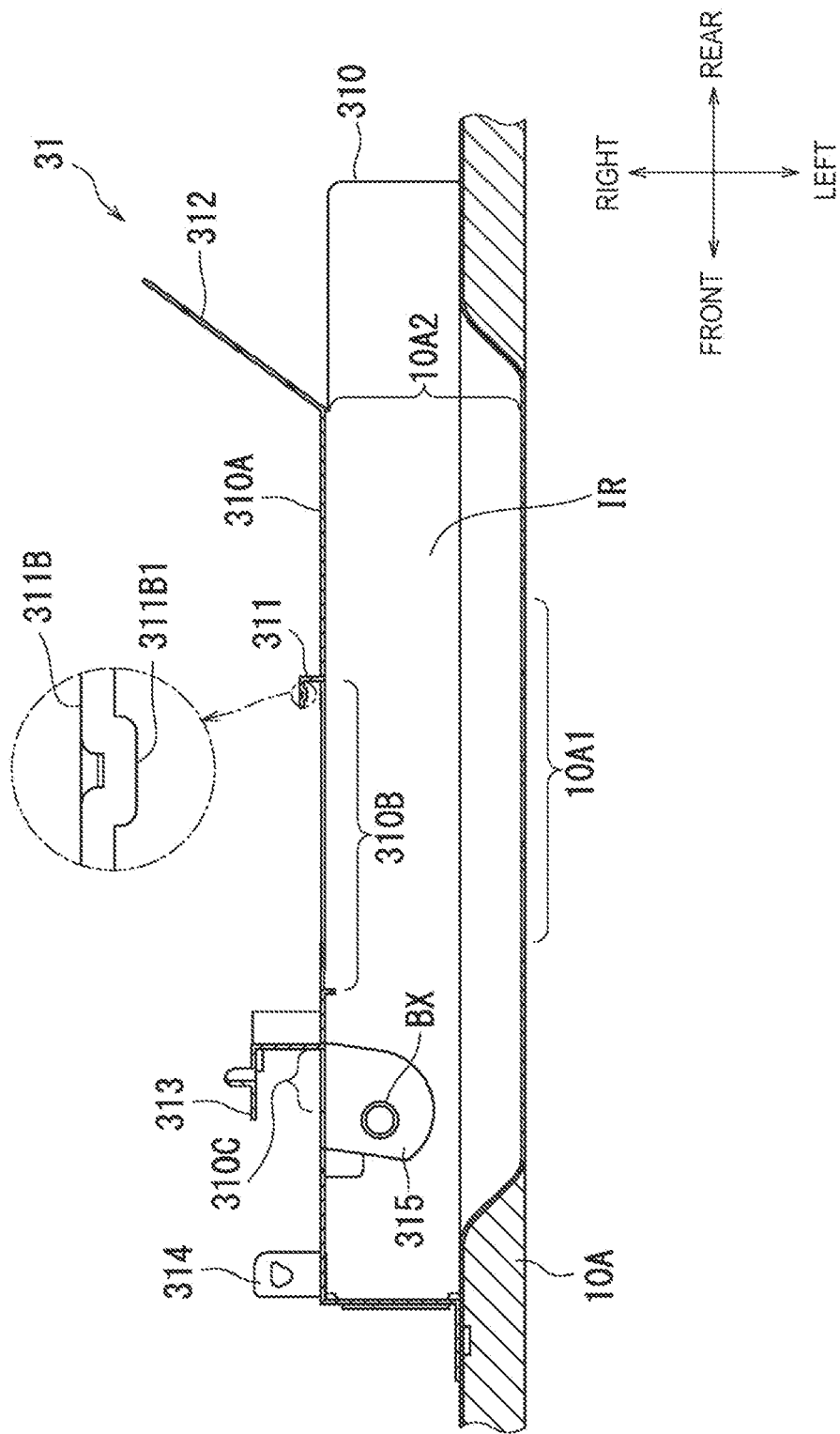
FIG. 13 is a cross-sectional view of the flowing portion along a section line XIII in FIG. 12.

Next, the configuration of the flowing portion 31 will be described with reference to FIG. 12 and FIG. 13. FIG. 12 is a perspective view of the flowing portion 31 according to the present embodiment. Specifically, FIG. 12 illustrates the flowing portion 31 in a lower diagonal direction from behind. FIG. 13 is a cross-sectional view of the flowing portion 31 along a section line XIII in FIG. 12.

The flowing portion 31 causes the blown air flow F to flow toward the air supply hole portions 10A1 of the right wall 10A. In addition, the flowing portion 31 functions as an attaching target portion for each of the cam 32 (see FIG. 11), the drive unit 33 (see FIG. 11), the lid portion 34 (see FIG. 11), the tension spring 35 (see FIG. 11), and the limit switch 36 (see FIG. 11). The flowing portion 31 is located on the right wall 10A.

As illustrated in FIG. 12 and FIG. 13, the flowing portion 31 includes a duct portion 310, a regulating portion 311, an air deflecting plate 312, two drive unit attachment portions 313, a spring attachment portion 314, and a lid portion attachment portion 315 (see FIG. 13). The duct portion 310, the regulating portion 311, the air deflecting plate 312, the two drive unit attachment portions 313, the spring attachment portion 314, and the lid portion attachment portion 315 are integrated.

As illustrated in FIG. 12, the duct portion 310 is a groove-shaped object having a substantially U-shaped cross-section with the front-rear direction as a longitudinal direction. The duct portion 310 is attached to an outer surface of the right wall 10A. As illustrated in FIG. 13, the duct portion 310 covers the air supply hole portions 10A1 of the right wall 10A. An air inlet 10A2 and an inner space IR are formed between the duct portion 310 and the outer surface of the right wall 10A. The air inlet 10A2 communicates with the inner space IR. The blown air flow F flows in the inner space IR.

Figure 22:
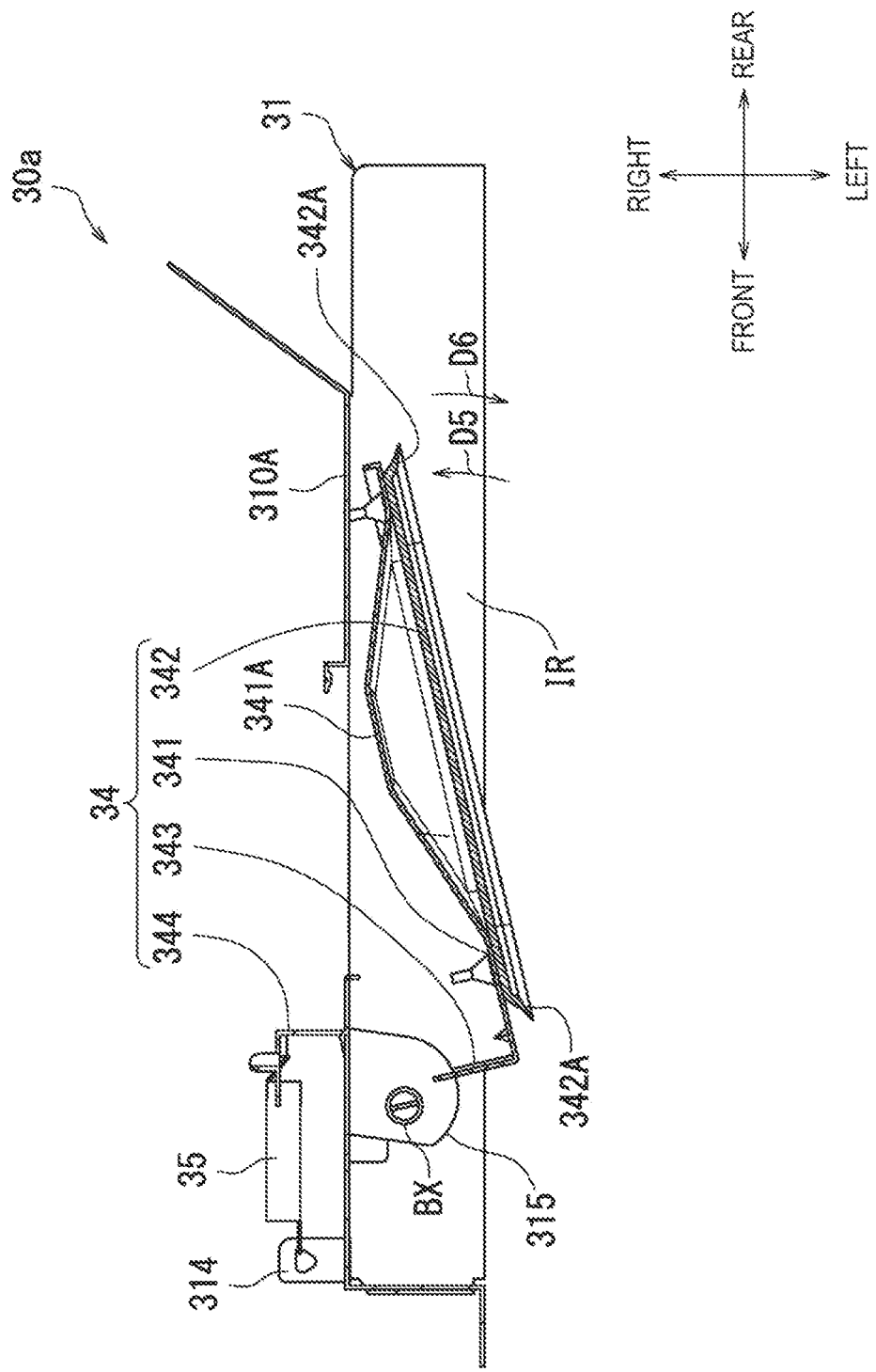
FIG. 22 is a cross-sectional view of the air supply damper along a section line XXII in FIG. 21.

The duct portion 310 includes a facing wall 310A facing the outer surface of the right wall 10A. The facing wall 310A is a plate-like object. The facing wall 310A includes an opening 310B. The opening 310B is a through hole into which the cam 32 (see FIG. 11) is fitted. The opening 310B faces the air supply hole portions 10A1 of the right wall 10A. As illustrated in FIG. 12, the facing wall 310A further includes a plurality of ventilation holes 310C and a slide hole 310D in addition to the opening 310B. The opening 310B is located at a substantially center portion of the facing wall 310A. In the present embodiment, the shape of the opening 310B is a substantially perfect circular shape. The plurality of ventilation holes 310C are through holes that guide the blown air flow F flowing through the inner space IR (see FIG. 13) to the outside of the inner space IR (see FIG. 13). Each of the plurality of ventilation holes 310C is located outside the opening 310B in a direction intersecting the left-right direction. The slide hole 310D is a through hole into which the spring attachment portion 344 of the lid portion 34, which will be described below with reference to FIG. 22, is inserted. The shape of the slide hole 310D is an oval shape with the front-rear direction as a longitudinal direction.

The regulating portion 311 regulates the posture of the cam 32 (see FIG. 11) that fits into the opening 310B. The regulating portion 311 is located at the rear peripheral edge portion of the opening 310B. The regulating portion 311 includes a standing portion 311A and a pressing portion 311B. The standing portion 311A and the pressing portion 311B are integrated. The standing portion 311A is provided to stand rightward from the right surface of the facing wall 310A. The pressing portion 311B extends frontward from a right end portion of the standing portion 311A. As illustrated in FIG. 13, the pressing portion 311B includes a core portion 311B1. The core portion 311B1 is a needle-like object. The core portion 311B1 protrudes leftward from the left surface of the pressing portion 311B toward the facing wall 310A. A tip end portion of the core portion 311B1 comes into point-contact with the right surface of an extension portion 321 of the cam 32 to be described below with reference to FIG. 14 to FIG. 18. The point-contact indicates that a contact area between the tip end portion of the core portion 311B1 and the right surface of the extension portion 321 of the cam 32 is sufficiently small. For example, the point-contact indicates that a contact area between the tip end portion of the core portion 311B1 and the right surface of the extension portion 321 of the cam 32 is equal to or less than 1 cm$^2$.

The air deflecting plate 312 changes a flow direction of the blown air flow F into a direction toward the inner space IR (see FIG. 13). The air deflecting plate 312 extends from a rear end portion of the facing wall 310A in a right rear direction.

The two drive unit attachment portions 313 are portions to which the drive unit 33 (see FIG. 11) is attached. Each of the two drive unit attachment portions 313 is provided to stand rightward from the right surface of the facing wall 310A. The height of each of the two drive unit attachment portions 313 in the left-right direction is such a height that the drive unit 33 presses the cam 32 (see FIG. 11) leftward when the drive unit 33 (see FIG. 11) is attached to the two drive unit attachment portions 313.

The spring attachment portion 314 is a portion to which the tension spring 35 (see FIG. 11) is attached. The spring attachment portion 314 is provided to stand rightward from the right surface of the facing wall 310A.

The lid portion attachment portion 315 is a portion to which the lid portion 34 (see FIG. 11) is attached. As illustrated in FIG. 13, the lid portion attachment portion 315 is provided to stand leftward from the left surface of the facing wall 310A. The lid portion attachment portion 315 is located at a front portion of the facing wall 310A.

Figure 14:
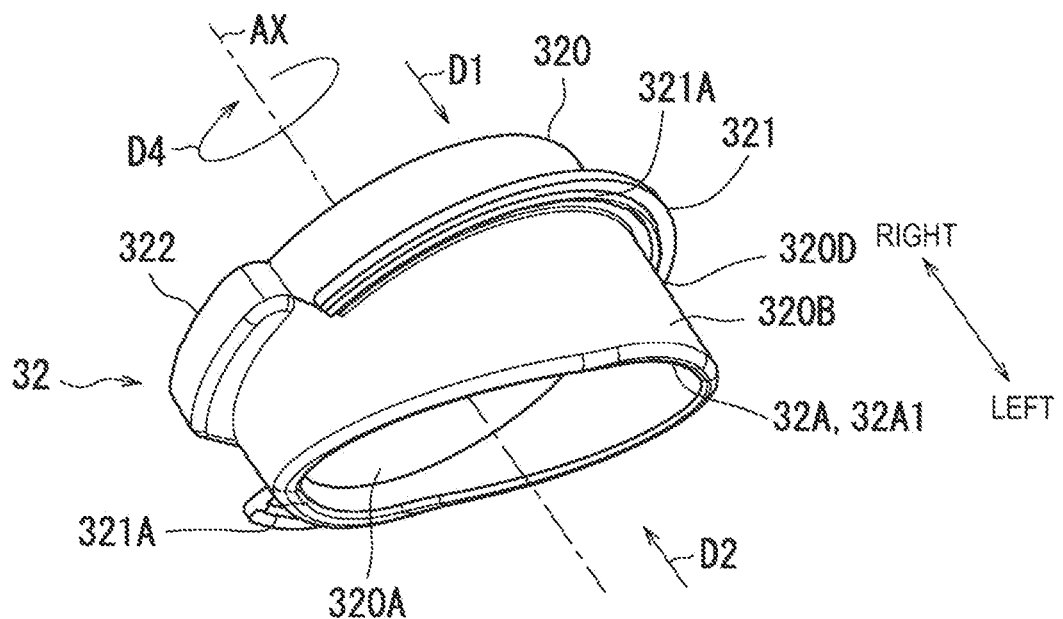
FIG. 14 is a perspective view of a cam according to the embodiment of the present invention.
Figure 15:
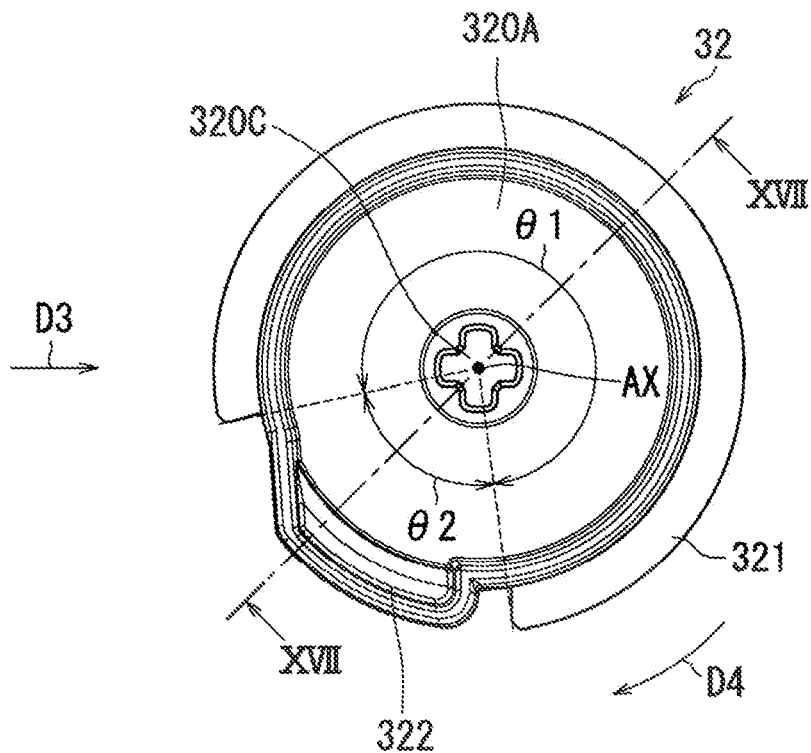
FIG. 15 is a front view of the cam from a first direction D1 in FIG. 14.
Figure 16:
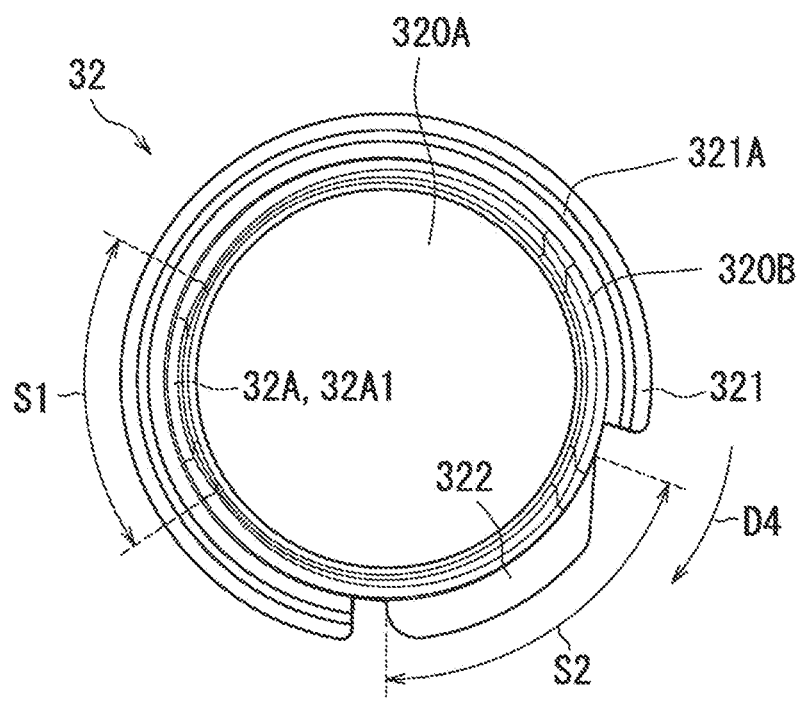
FIG. 16 is a rear view of the cam from a second direction D2 in FIG. 14.
Figure 17:
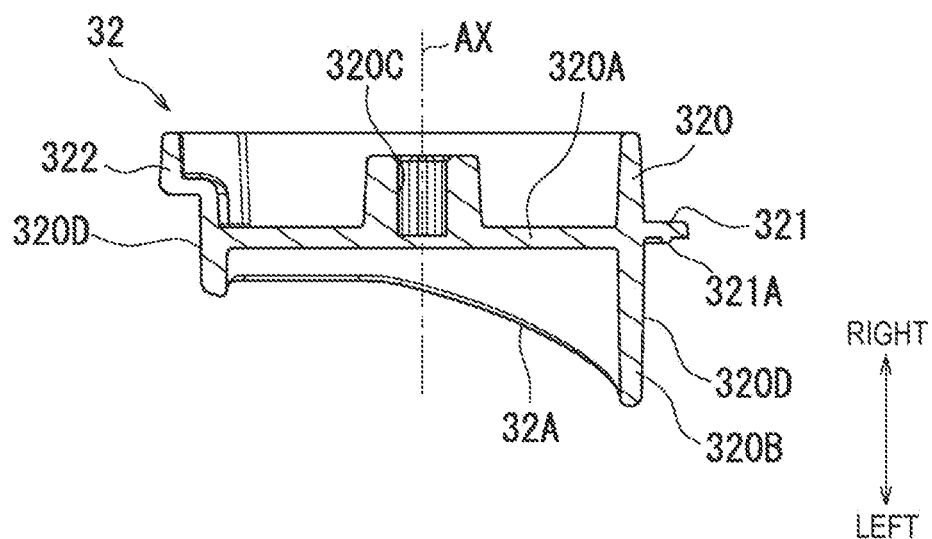
FIG. 17 is a cross-sectional view of the cam along a section line XVII in FIG. 15.
Figure 18:
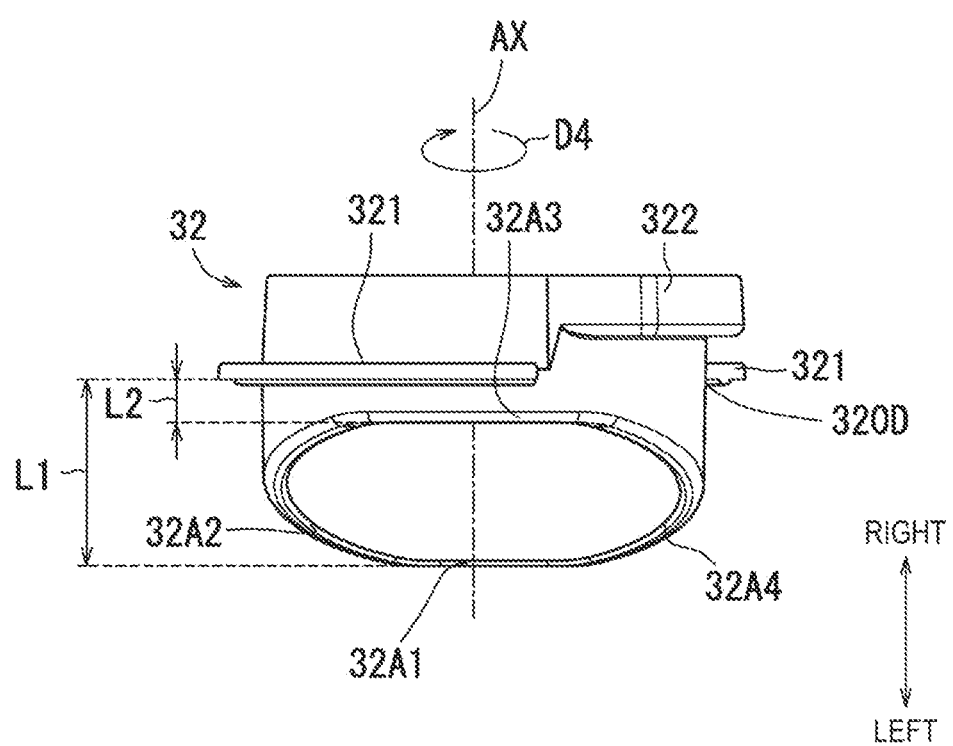
FIG. 18 is a side view of the cam from a third direction D3 in FIG. 15.

Next, the configuration of the cam 32 will be described with reference to FIG. 14 to FIG. 19. FIG. 14 is a perspective view of the cam 32 according to the present embodiment. FIG. 15 is a front view of the cam 32 viewed in a first direction D1 in FIG. 14. FIG. 16 is a rear view of the cam 32 viewed in a second direction D2 in FIG. 14. FIG. 17 is a cross-sectional view of the cam 32 along a section line XVII in FIG. 15. FIG. 18 is a side view of the cam 32 viewed in a third direction D3 in FIG. 15.

As illustrated in FIG. 14, the cam 32 rotates in a clockwise direction D4 with a rotation axis line AX as a central axis by the drive unit 33 (see FIG. 11). As illustrated in FIG. 14 to FIG. 19, the cam 32 is a cylindrical end cam. As illustrated in FIG. 14, the cam 32 includes a cam body 320, the extension portion 321, and a protrusion portion 322. The cam 32 rotatably fits into the opening 310B (see FIG. 12) of the facing wall 310A. The direction of the rotation axis line AX is substantially parallel to the left-right direction.

As illustrated in FIG. 17, the cam body 320 includes a circular plate portion 320A, a cylindrical portion 320B, and a boss portion 320C. The cylindrical portion 320B extends leftward from an outer peripheral edge portion of the circular plate portion 320A. The end face of the cylindrical portion 320B functions as a cam surface 32A. The cam surface 32A abuts against the lid portion 34 (see FIG. 11). The cylindrical portion 320B is inserted into the opening 310B (see FIG. 12) of the facing wall 310A when the cam 32 is fitted into the opening 310B (see FIG. 12) of the facing wall 310A. The boss portion 320C is a portion to which the drive unit 33 (see FIG. 11) is attached. The boss portion 320C protrudes rightward from a substantially center portion of the circular plate portion 320A. The cam body 320 has an outer peripheral surface 320D.

The extension portion 321 is a portion that can be sandwiched between the core portion 311B1 (see FIG. 13) of the regulating portion 311 and the right surface of the facing wall 310A (see FIG. 13). The extension portion 321 is sandwiched between the core portion 311B1 (see FIG. 13) and the right surface of the facing wall 310A (see FIG. 13), and thus the posture of the cam 32 can be maintained even when external force is applied to the cam 32. As illustrated in FIG. 14, the extension portion 321 protrudes from the outer peripheral surface 320D of the cam body 320 in a direction intersecting the rotation axis line AX. As illustrated in FIG. 15, the shape of the extension portion 321 is a substantially arc shape along the circumferential direction of the cam body 320. The extension portion 321 is formed over a range of an angle θ1 relative to the entire circumference of the outer peripheral surface 320D of the cam body 320. The angle θ1 is, for example, 270 degrees. As illustrated in FIG. 16, the extension portion 321 includes a rib portion 321A. The rib portion 321A is formed throughout the entire extension portion 321 along a circumferential direction of the cam body 320. As illustrated in FIG. 17, the rib portion 321A protrudes leftward from the extension portion 321. The rib portion 321A slides on the right surface of the facing wall 310A (see FIG. 13).

The protrusion portion 322 is an area that is detected by the limit switch 36 (see FIG. 11). As illustrated in FIG. 14, the protrusion portion 322 protrudes from the outer peripheral surface 320D of the cam body 320 in a direction intersecting the rotation axis line AX. The protrusion portion 322 is located rightward from the extension portion 321 in the left-right direction. That is, the protrusion portion 322 is located at a position farther from the right wall 10A than the extension portion 321 in the left-right direction when the cam 32 is fitted into the opening 310B (see FIG. 12) of the facing wall 310A. As illustrated in FIG. 15, the protrusion portion 322 is formed over a range of an angle θ2 relative to the entire circumference of the outer peripheral surface 320D of the cam body 320. The angle θ2 is, for example, 90 degrees. The protrusion portion 322 is located, in the circumferential direction of the cam body 320, at a position where the extension portion 321 is not formed.

As illustrated in FIG. 18, the cam surface 32A includes an abutting surface 32A1, a downward inclined surface 32A2, a low flat surface 32A3, and an upward inclined surface 32A4. The abutting surface 32A1, the downward inclined surface 32A2, the low flat surface 32A3, and the upward inclined surface 32A4 are continuous in that order in the clockwise direction D4 of the rotation axis line AX. The abutting surface 32A1 is an example of an abutting portion.

The abutting surface 32A 1 is a portion of the cam surface 32A farthest from the extension portion 321 of the cam 32. A distance between the abutting surface 32A1 and the extension portion 321 in the left-right direction is a longest distance L1. The abutting surface 32A1 is substantially parallel to the left surface or the right surface of the extension portion 321. The abutting surface 32A1 extends in the circumferential direction of the cam body 320. The abutting surface 32A1 abuts against the lid portion 34 in a state where the lid portion 34 (see FIG. 11) closes the air supply hole portions 10A1 (see FIG. 13) of the right wall 10A. The abutting surface 32A1 does not abut against the lid portion 34 in a state where the lid portion 34 (see FIG. 11) opens the air supply hole portions 10A1 (see FIG. 13) of the right wall 10A.

The low flat surface 32A3 is a portion of the cam surface 32A closest to the extension portion 321 of the cam 32. A distance between the low flat surface 32A3 and the extension portion 321 in the left-right direction is a shortest distance L2, and the shortest distance L2 is shorter than the longest distance L1. The low flat surface 32A3 is substantially parallel to the left surface or the right surface of the extension portion 321. The low flat surface 32A3 extends in the circumferential direction of the cam body 320.

A distance between the downward inclined surface 32A2 and the extension portion 321 in the left-right direction gradually decreases from the longest distance L1 along the clockwise direction D4 to become the shortest distance L2. A distance between the upward inclined surface 32A4 and the extension portion 321 in the left-right direction increases from the shortest distance L2 along the clockwise direction D4 to become the longest distance L1.

As illustrated in FIG. 16, a first range S1 and a second range S2 are separated from each other in the circumferential direction of the cam 32. The first range S1 indicates a range in which the abutting surface 32A1 of the cam surface 32A is formed. The extension portion 321 is formed in the first range S1. The second range S2 indicates a range in which the protrusion portion 322 is formed. The extension portion 321 is not formed in the second range S2. A first distance along the outer peripheral surface 320D of the cam 32 in the first range S1 and a second distance along the outer peripheral surface 320D of the cam 32 in the second range S2 are substantially the same. Accordingly, as will be described below with reference to FIG. 21, FIG. 23, and FIG. 24, a movable contact 36A (FIG. 23) of the limit switch 36 (FIG. 11) comes into contact with the protrusion portion 322 of the cam 32 while the abutting surface 32A1 (see FIG. 18) of the cam 32 and a convex portion 341A of the lid portion 34 (see FIG. 22) abut against each other.

Figure 19:
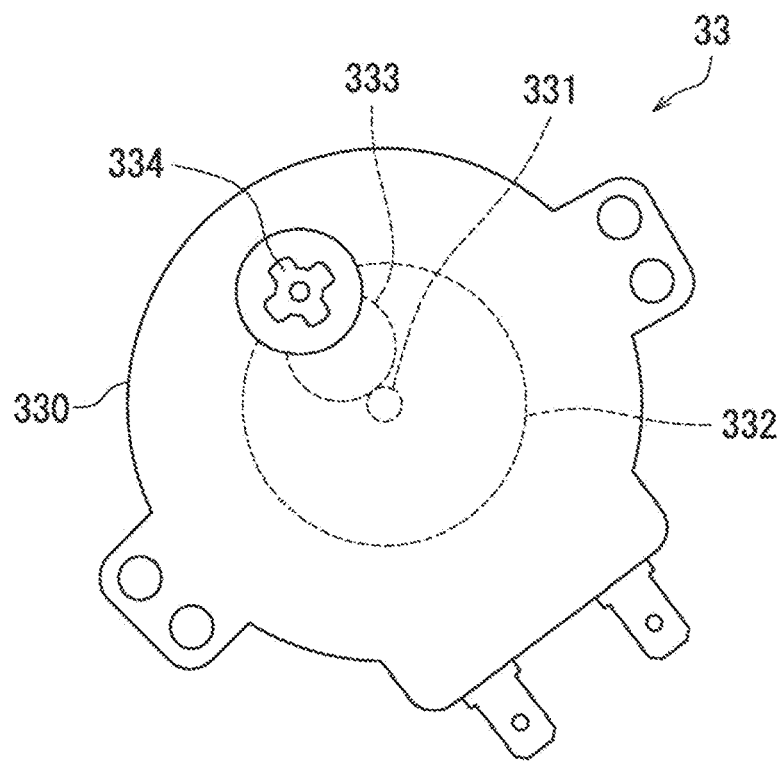
FIG. 19 is a front view of a drive unit according to the embodiment of the present invention.
Figure 20:
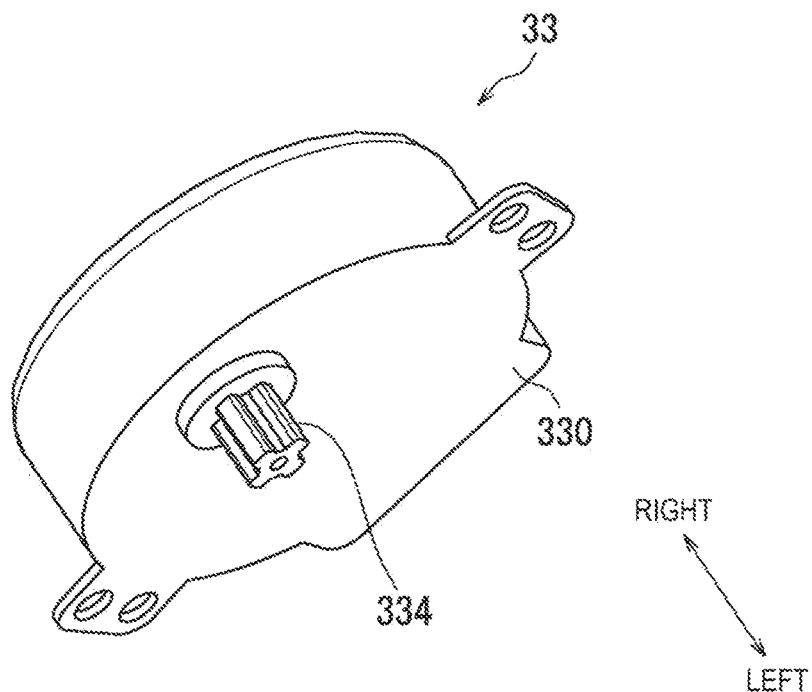
FIG. 20 is a perspective view of the drive unit according to the embodiment of the present invention.

Next, the configuration of the drive unit 33 will be described with reference to FIG. 19 and FIG. 20. FIG. 19 is a front view of the drive unit 33 according to the present embodiment. FIG. 20 is a perspective view of the drive unit 33 according to the present embodiment.

The drive unit 33 rotates the cam 32 (see FIG. 11). The drive unit 33 is attached to the two drive unit attachment portions 313 described with reference to FIG. 12. The drive unit 33 and the right surface of the facing wall 310A (see FIG. 13) interpose the cam 32 (see FIG. 11) therebetween.

As illustrated in FIG. 19, the drive unit 33 includes a housing 330, a motor shaft 331, a motor body 332, a gear 333, and an output shaft 334. The housing 330 accommodates the motor shaft 331, the motor body 332, and the gear 333. The housing 330 is a flat box-like object having a substantially circular shape.

The motor body 332 rotates the motor shaft 331. The motor body 332 includes, for example, a Direct Current (DC) brushless motor. The gear 333 transmits driving force of the motor shaft 331 to the output shaft 334. As illustrated in FIG. 20, the output shaft 334 protrudes leftward from the left surface of the housing 330. The output shaft 334 is attached to the boss portion 320C (see FIG. 17) of the cam 32. The output shaft 334 rotates the cam 32 (see FIG. 14) based on the driving force transmitted from the motor shaft 331. The rotational speed of the output shaft 334 is, for example, 6 rpm.

As illustrated in FIG. 19 and FIG. 20, the output shaft 334 is eccentric relative to the motor shaft 331. Thus, as illustrated in FIG. 3, when the air supply damper 30a is viewed from the right side, a portion of the cam 32 is exposed from the drive unit 33.

Figure 21:
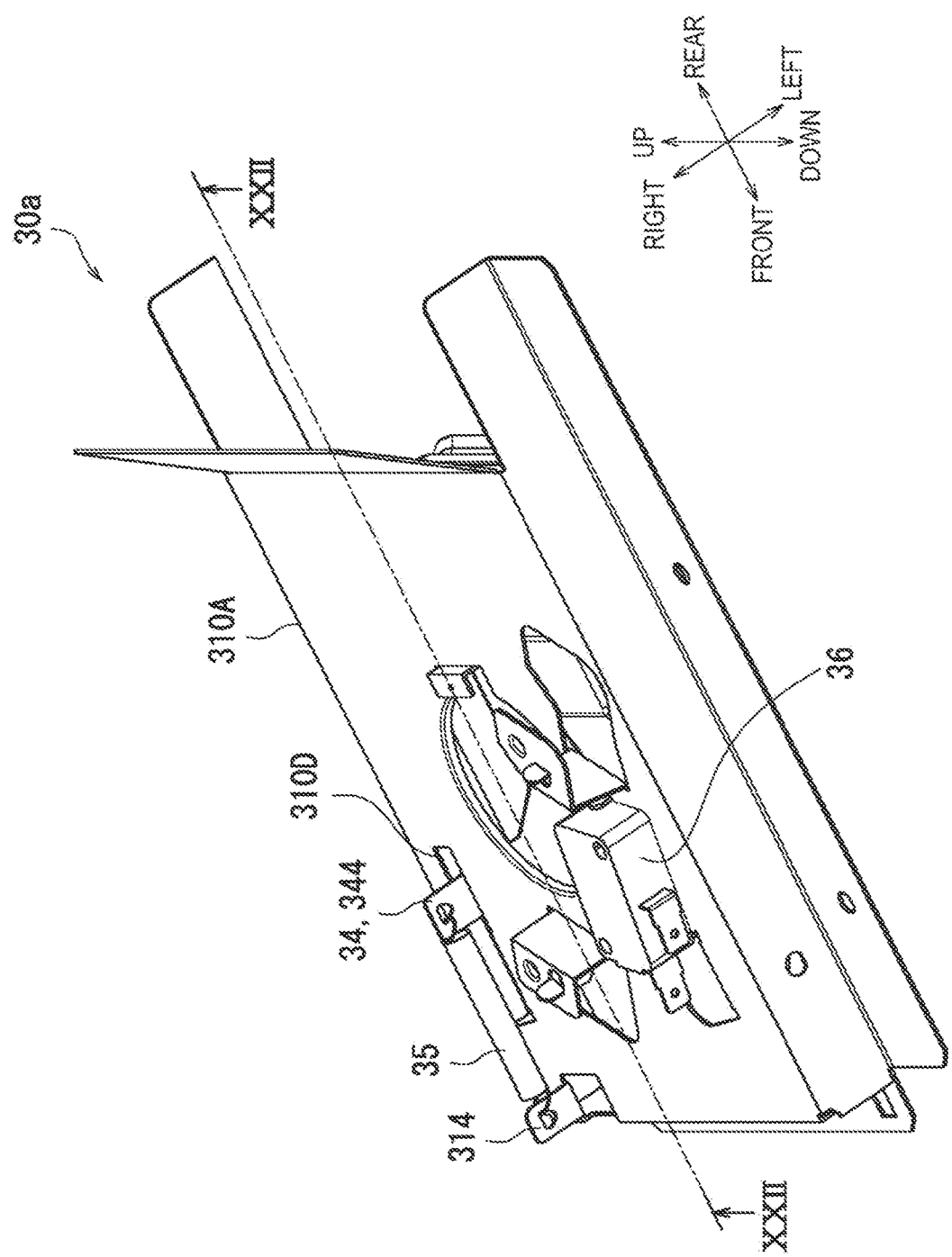
FIG. 21 is a perspective view of the air supply damper according to the embodiment of the present invention.

Next, a configuration of the lid portion 34 will be further described with reference to FIG. 21 and FIG. 22. FIG. 21 is a perspective view of the air supply damper 30a according to the present embodiment. Specifically, FIG. 21 illustrates the air supply damper 30a in a state where the cam 32 and the drive unit 33 are removed, in a lower right diagonal direction from the front. FIG. 22 is a cross-sectional view of the air supply damper 30a along a section line XXII in FIG. 21.

The lid portion 34 opens or closes the air supply hole portions 10A1 of the right wall 10A described with reference to FIG. 8 and FIG. 13 in response to the rotation of the cam 32 (see FIG. 14). As illustrated in FIG. 22, the lid portion 34 is disposed in the inner space IR. The lid portion 34 includes a valve body 341, a packing 342, a flowing portion attachment portion 343, and a spring attachment portion 344. The valve body 341, the flowing portion attachment portion 343, and the spring attachment portion 344 are integrated.

The valve body 341 is a lid-like object. The valve body 341 includes the convex portion 341A. The convex portion 341A sequentially abuts, while the cam 32 is rotated once by the drive unit 33, against the abutting surface 32A1, the downward inclined surface 32A2, the low flat surface 32A3, and the upward inclined surface 32A4 that are described with reference to FIG. 18.

The packing 342 is attached to the valve body 341. The material of the packing 342 includes a synthetic resin. The synthetic resin includes, for example, silicone rubber. The packing 342 has, for example, a substantially rectangular shape. The packing 342 includes a fin portion 342A at its outer peripheral edge portion. When the lid portion 34 closes the air supply hole portions 10A1 of the right wall 10A, the packing 342 is pressed against the outer surface of the right wall 10A. Thereby, the fin portion 342A of the packing 342 is pressed and bent toward the outside of the outer peripheral edge portion of the packing 342. As a result, the lid portion 34 closes the air supply hole portions 10A1 of the right wall 10A.

The flowing portion attachment portion 343 is connected to the lid portion attachment portion 315 of the flowing portion 31 by a hinge shaft BX. The lid portion 34 can pivot relative to the duct portion 310 in a separation direction D5 or a contact direction D6 around the hinge shaft BX. The separation direction D5 indicates a direction away from the air supply hole portions 10A1 of the right wall 10A. The contact direction D6 indicates a direction approaching the air supply hole portions 10A1 of the right wall 10A.

As illustrated in FIG. 21, the tension spring 35 is attached to the spring attachment portion 344. The spring attachment portion 344 is inserted into the slide hole 310D. The spring attachment portion 344 protrudes rightward from the slide hole 310D.

Next, a configuration of the tension spring 35 will be described with reference to FIG. 21 and FIG. 22. As illustrated in FIG. 22, the tension spring 35 biases the lid portion 34 in the separation direction D5. The tension spring 35 is located on the right surface of the facing wall 310A. Specifically, one end of the tension spring 35 engages with the spring attachment portion 314 of the flowing portion 31. The other end of the tension spring 35 engages with the spring attachment portion 344 of the lid portion 34. Thereby, in a case where external force is not applied to the lid portion 34, the lid portion 34 pivots around the hinge shaft BX toward the separation direction D5. On the other hand, in a case where external force against biasing force of the tension spring 35 is applied to the lid portion 34, the lid portion 34 pivots around the hinge shaft BX toward the contact direction D6.

Figure 23:
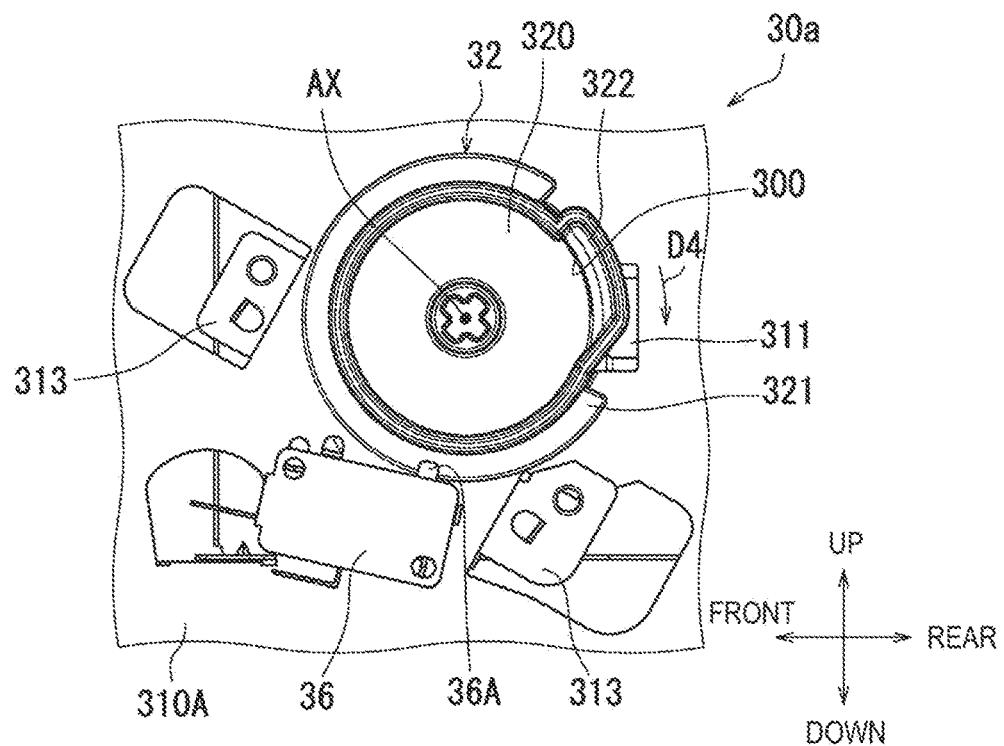
FIG. 23 is a partial front view of the air supply damper in an off state of a limit switch according to the present invention.
Figure 24:
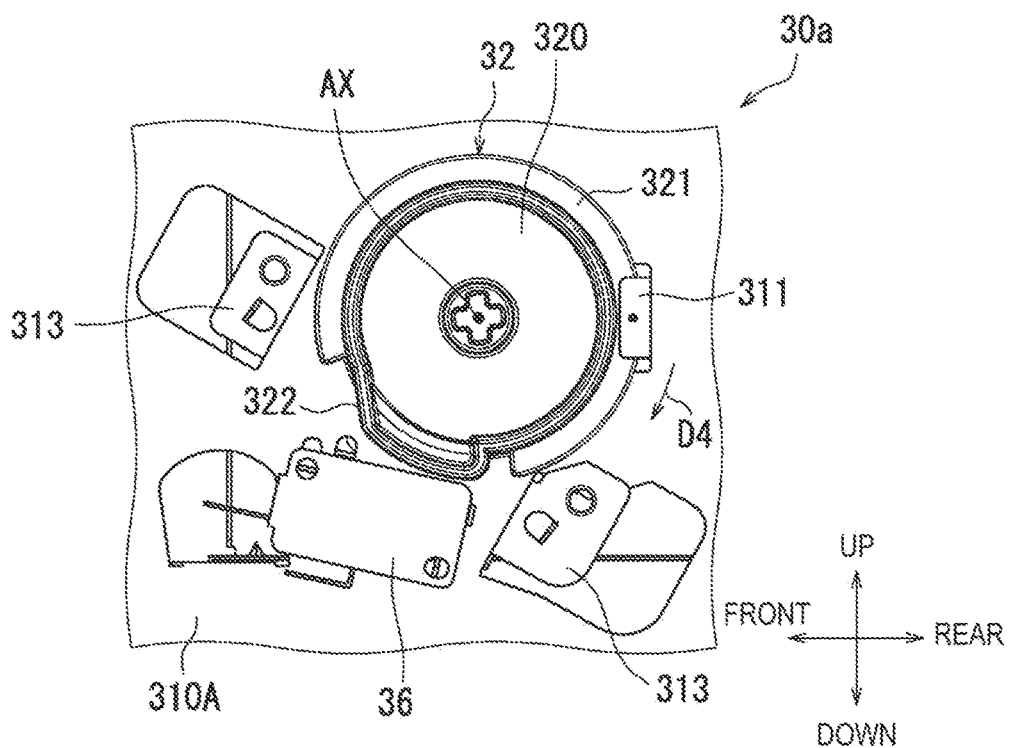
FIG. 24 is a partial front view of the air supply damper in an on state of the limit switch according to the present invention.

Next, the configuration of the limit switch 36 will be described with reference to FIG. 21, FIG. 23, and FIG. 24. FIG. 23 is a partial front view of the air supply damper 30a in an off state of the limit switch 36 according to the present embodiment. Specifically, FIG. 23 illustrates a partial front view of the air supply damper 30a in a state where the drive unit 33 is removed. FIG. 24 is a partial front view of the air supply damper 30a in an on state of the limit switch 36 according to the present embodiment. Specifically, FIG. 24 illustrates the air supply damper 30a in a state where the drive unit 33 is removed.

The limit switch 36 detects the position of the abutting surface 32A1 (see FIG. 18) based on the protrusion portion 322 of the cam 32. The limit switch 36 includes the movable contact 36A. The movable contact 36A is located at a position where the movable contact 36A can come into contact with the protrusion portion 322 and does not come into contact with the extension portion 321. The movable contact 36A is located at substantially the same height as the protrusion portion 322 relative to the right surface of the facing wall 310A in the left-right direction.

As illustrated in FIG. 23, the limit switch 36 faces the cam body 320 in a direction intersecting the direction of the rotation axis line AX of the cam 32. Specifically, the movable contact 36A of the limit switch 36 is disposed to come into contact with the protrusion portion 322 of the cam 32 while the abutting surface 32A1 (see FIG. 18) of the cam 32 and the convex portion 341A (see FIG. 22) of the lid portion 34 abut against each other and is disposed not to come into contact with the protrusion portion 322 of the cam 32 while any one of the downward inclined surface 32A2, the low flat surface 32A3, and the upward inclined surface 32A4 of the cam 32 described with reference to FIG. 18 and the convex portion 341A (see FIG. 22) of the lid portion 34 abut against each other. Thus, the limit switch 36 detects that the abutting surface 32A1 (see FIG. 18) of the cam 32 abuts against the convex portion 341A (see FIG. 22) of the lid portion 34 and the lid portion 34 (see FIG. 22) closes the air supply hole portions 10A1 (see FIG. 13) of the right wall 10A by the movable contact 36A coming into contact with the protrusion portion 322 of the cam 32.

The limit switch 36 outputs an off-signal to a control unit 26 to be described below with reference to FIG. 31 in a case where the movable contact 36A is not in contact with the protrusion portion 322. As illustrated in FIG. 24, in a case where the movable contact 36A is in contact with the protrusion portion 322, an on-signal is output to the control unit 26 to be described below with reference to FIG. 31.

Figure 25:
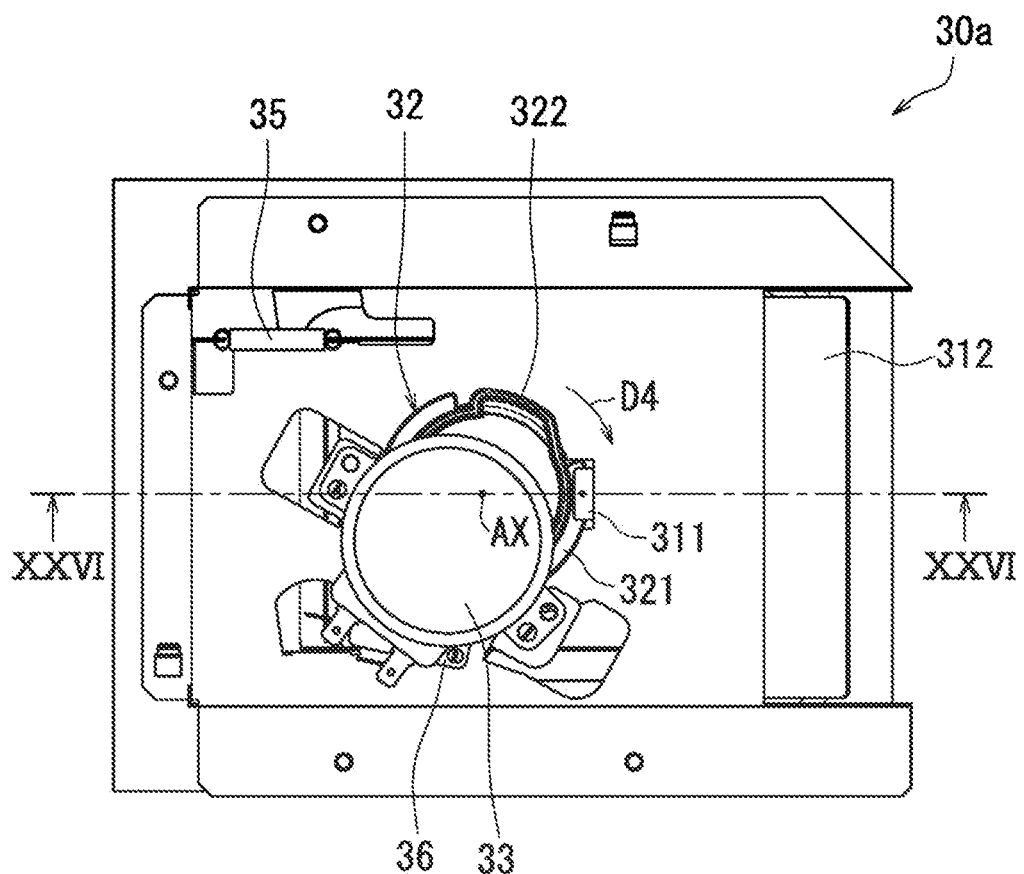
FIG. 25 is a front view of the air supply damper according to the embodiment of the present invention.
Figure 26:
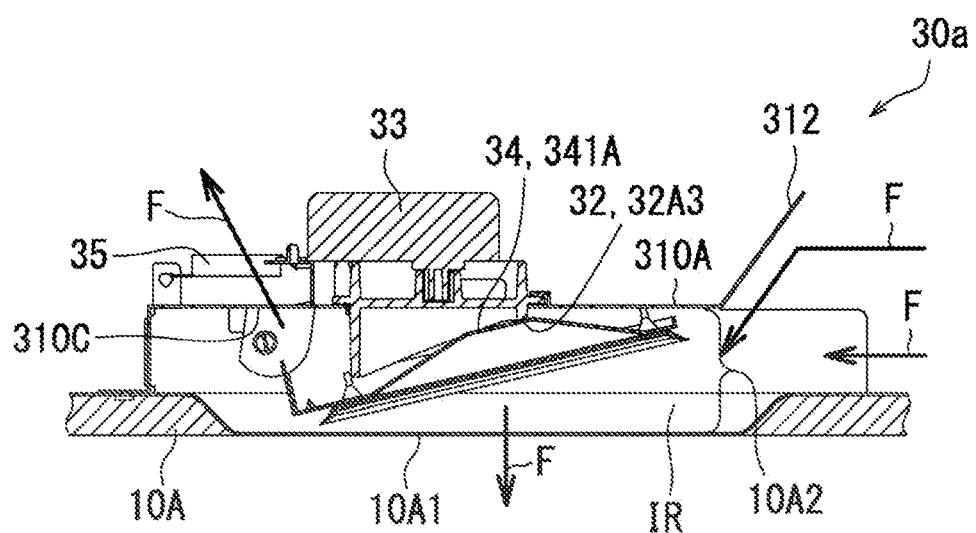
FIG. 26 is a cross-sectional view of the air supply damper along a section line XXVI in FIG. 25.
Figure 27:
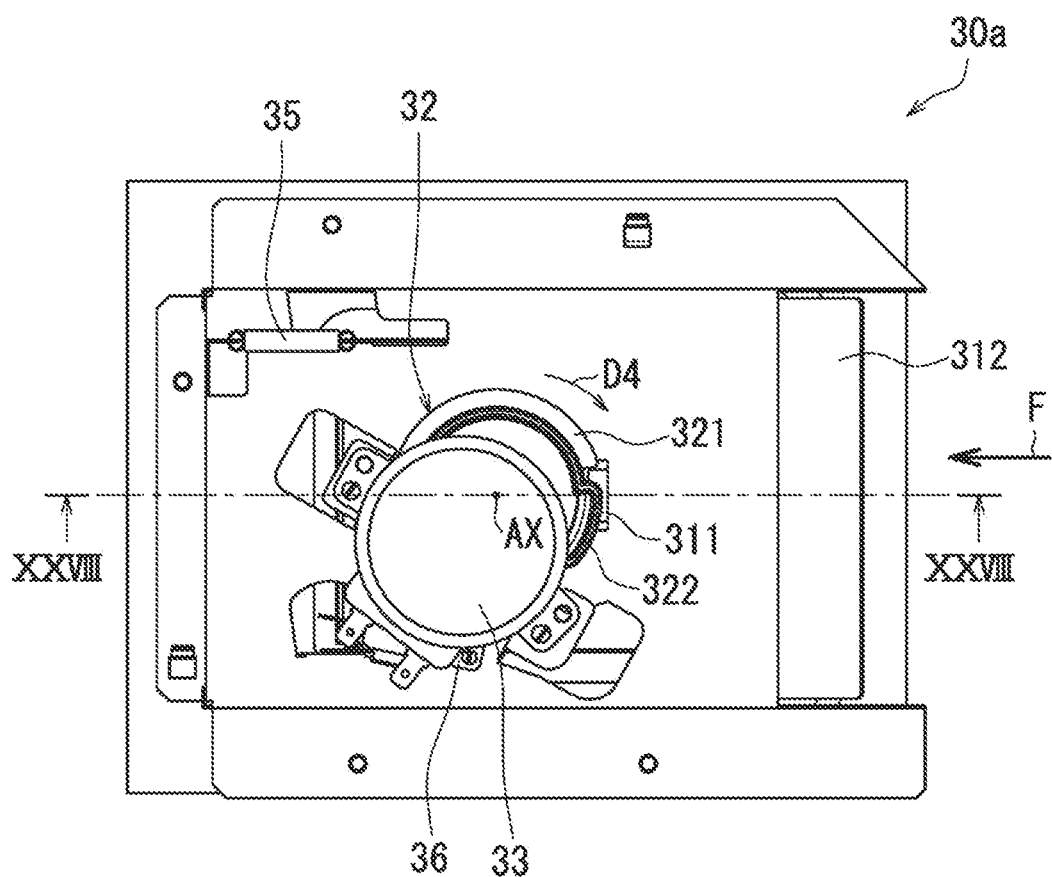
FIG. 27 is a front view of the air supply damper according to the embodiment of the present invention.
Figure 28:
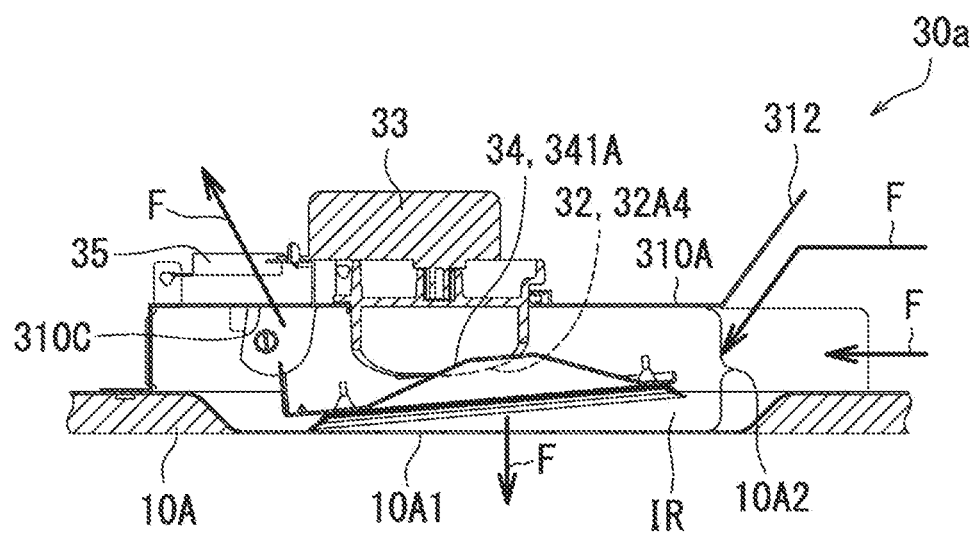
FIG. 28 is a cross-sectional view of the air supply damper along a section line XXVIII in FIG. 27.
Figure 29:
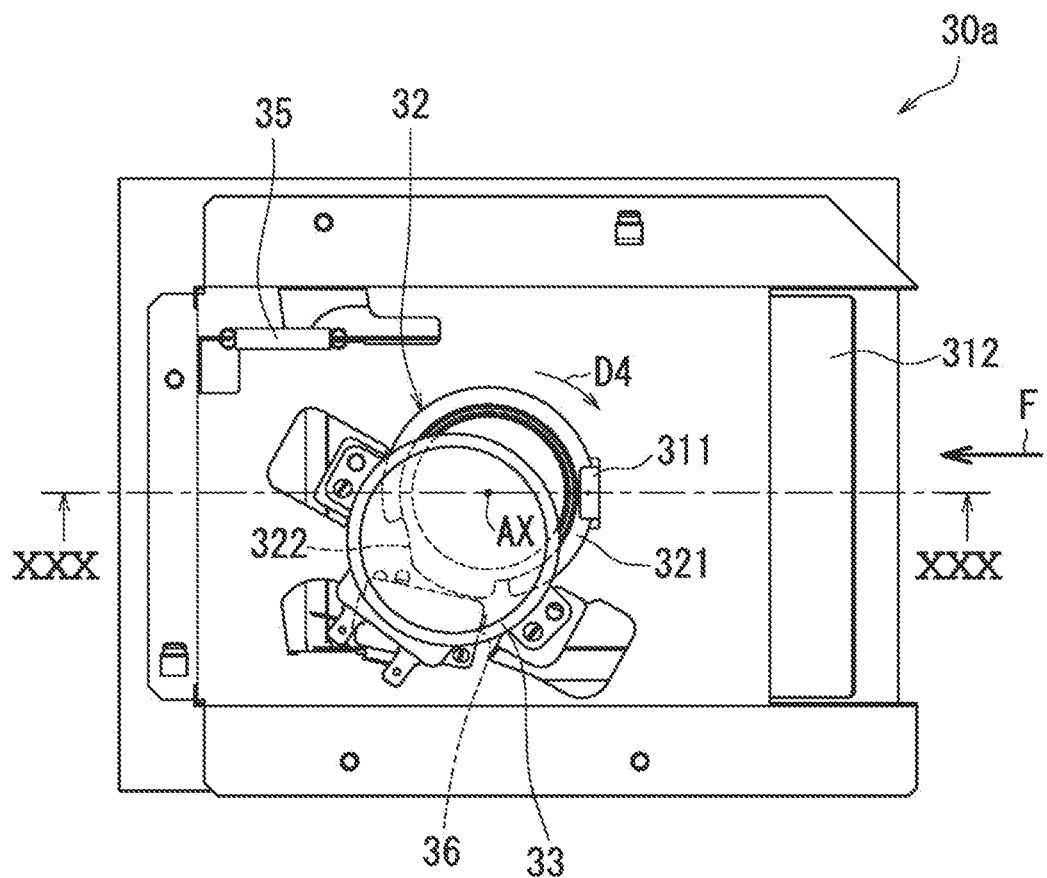
FIG. 29 is a front view of the air supply damper according to the embodiment of the present invention.
Figure 30:
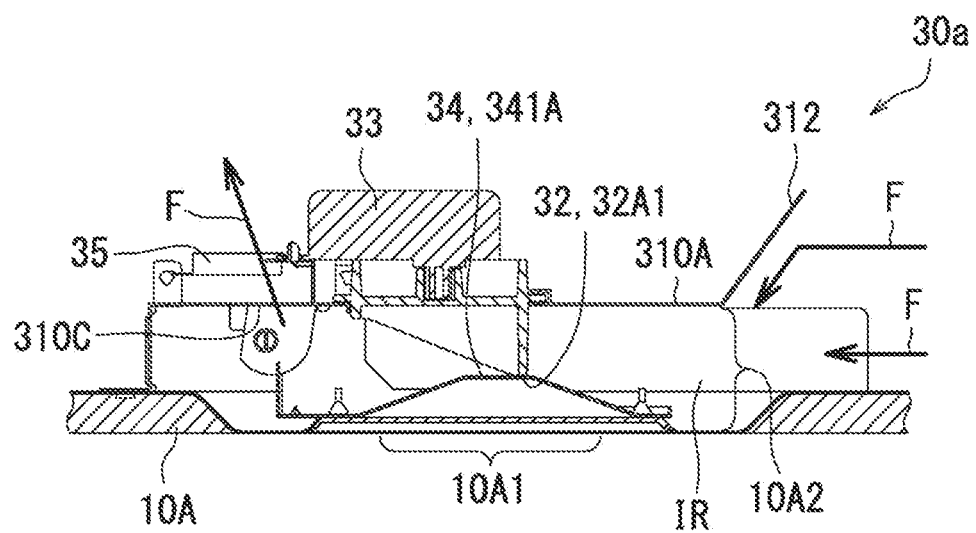
FIG. 30 is a cross-sectional view of the air supply damper along a section line XXX in FIG. 29.

Next, an opening/closing operation of the air supply damper 30a will be specifically described with reference to FIG. 25 to FIG. 30. FIG. 25 is a front view of the air supply damper 30a according to the present embodiment. Specifically, FIG. 25 illustrates the air supply damper 30a in which the lid portion 34 opens the air supply hole portions 10A1 of the right wall 10A. FIG. 26 is a cross-sectional view of the air supply damper 30a along a section line XXVI in FIG. 25. FIG. 27 illustrates a front view of the air supply damper 30a according to the present embodiment. Specifically, FIG. 27 illustrates the air supply damper 30a immediately before the lid portion 34 opens the air supply hole portions 10A1 of the right wall 10A and the regulating portion 311 comes into contact with the extension portion 321 of the cam 32. FIG. 28 is a cross-sectional view of the air supply damper 30a along a section line XXVIII in FIG. 27. FIG. 29 is a front view of the air supply damper 30a according to the present embodiment. Specifically, FIG. 29 illustrates the air supply damper 30a in which the lid portion 34 closes the air supply hole portions 10A1 of the right wall 10A. FIG. 30 is a cross-sectional view of the air supply damper 30a along a section line XXX in FIG. 29.

As illustrated in FIG. 25, the cam 32 rotates at a predetermined rotational speed in the clockwise direction D4 by driving force of the drive unit 33. When the cam 32 rotates in the clockwise direction D4, the protrusion portion 322 of the cam 32 is located downstream of the cam 32 relative to the regulating portion 311 in the clockwise direction D4. That is, the protrusion portion 322 of the cam 32 is not in contact with the movable contact 36A (see FIG. 23) of the limit switch 36. At this time, as illustrated in FIG. 26, the convex portion 341A of the lid portion 34 abuts against the low flat surface 32A3 of the cam surface 32A. For this reason, the lid portion 34 opens the air supply hole portions 10A1 of the right wall 10A.

As illustrated in FIG. 26, the blown air flow F in the exhaust space BR flows from the air inlet 10A2 into the inner space IR. Part of the blown air flow F flowing through the inner space IR flows into the accommodation space 1A (see FIG. 8) through the air supply hole portions 10A1 of the right wall 10A. The rest of the blown air flow F flowing through the inner space IR flows into the exhaust space BR (see FIG. 8) through the plurality of ventilation holes 310C (see FIG. 12) of the facing wall 310A.

When the cam 32 rotates in the clockwise direction D4 from the position illustrated in FIG. 25, the protrusion portion 322 of the cam 32 is located to the right of the regulating portion 311 in the left-right direction as illustrated in FIG. 27. That is, the protrusion portion 322 of the cam 32 is not in contact with the movable contact 36A (see FIG. 23) of the limit switch 36. At this time, as illustrated in FIG. 28, the convex portion 341A of the lid portion 34 abuts against the upward inclined surface 32A4 of the cam surface 32A. For this reason, the lid portion 34 opens the air supply hole portions 10A1 of the right wall 10A. In addition, as illustrated in FIG. 27, the extension portion 321 of the cam 32 is not in contact with the regulating portion 311.

As illustrated in FIG. 28, the blown air flow F in the exhaust space BR flows from the air inlet 10A2 into the inner space IR. Part of the blown air flow F flowing through the inner space IR flows into the accommodation space 1A (see FIG. 8) through the air supply hole portions 10A1 of the right wall 10A. The rest of the blown air flow F flowing through the inner space IR flows into the exhaust space BR (see FIG. 8) through the plurality of ventilation holes 310C (see FIG. 12) of the facing wall 310A.

As illustrated in FIG. 27, when the cam 32 further rotates in the clockwise direction D4, the extension portion 321 of the cam 32 starts coming into point-contact with the regulating portion 311. Further, when the cam 32 rotates in the clockwise direction D4, the protrusion portion 322 of the cam 32 comes into contact with the movable contact 36A (see FIG. 23) of the limit switch 36 as illustrated in FIG. 29. At this time, as illustrated in FIG. 30, the convex portion 341A of the lid portion 34 abuts against the abutting surface 32A1 of the cam surface 32A. For this reason, the lid portion 34 closes the air supply hole portions 10A1 of the right wall 10A by the cam 32 pressing the lid portion 34 against biasing force of the tension spring 35. That is, the regulating portion 311 abuts against the extension portion 321 before the abutting surface 32A1 abuts against the lid portion 34 depending on the rotation of the cam 32.

In the present embodiment, when the lid portion 34 closes the air supply hole portions 10A1 of the right wall 10A, the abutting surface 32A1 of the cam 32 presses the lid portion 34 against the biasing force of the tension spring 35 to press the lid portion 34 against the outer surface of the right wall 10A. Thereby, as described with reference to FIG. 22, the cam 32 presses and bends the fin portion 342A of the packing 342 toward the outside of the outer peripheral edge portion of the packing 342 to cause the lid portion 34 to close the air supply hole portions 10A1 of the right wall 10A. At the moment when the lid portion 34 closes the air supply hole portions 10A1 of the right wall 10A, that is, at the moment when the fin portion 342A of the packing 342 is pressed and bent, the cam 32 receives the greatest repulsive force from the lid portion 34 toward the separation direction D5 illustrated in FIG. 22. At this moment, as illustrated in FIG. 29, the extension portion 321 of the cam 32 exposed from the drive unit 33 abuts against the regulating portion 311. In a state where the lid portion 34 closes the air supply hole portions 10A1 of the right wall 10A, the regulating portion 311 abuts against the extension portion 321 of the cam 32 to regulate the movement of the lid portion 34 in the separation direction D5. Thus, the cam 32 can reliably press and bend the fin portion 342A of the packing 342 to cause the lid portion 34 to reliably close the air supply hole portions 10A1 of the right wall 10A.

As illustrated in FIG. 30, the blown air flow F in the exhaust space BR flows from the air inlet 10A2 into the inner space IR. The blown air flow F flowing through the inner space IR flows into the exhaust space BR (see FIG. 8) through the plurality of ventilation holes 310C (see FIG. 12) of the facing wall 310A.

The configuration of the heating cooking apparatus 1 will be further described with reference to FIG. 31. FIG. 31 is a block diagram illustrating the configuration of the heating cooking apparatus 1 according to the present embodiment.

Figure 31:
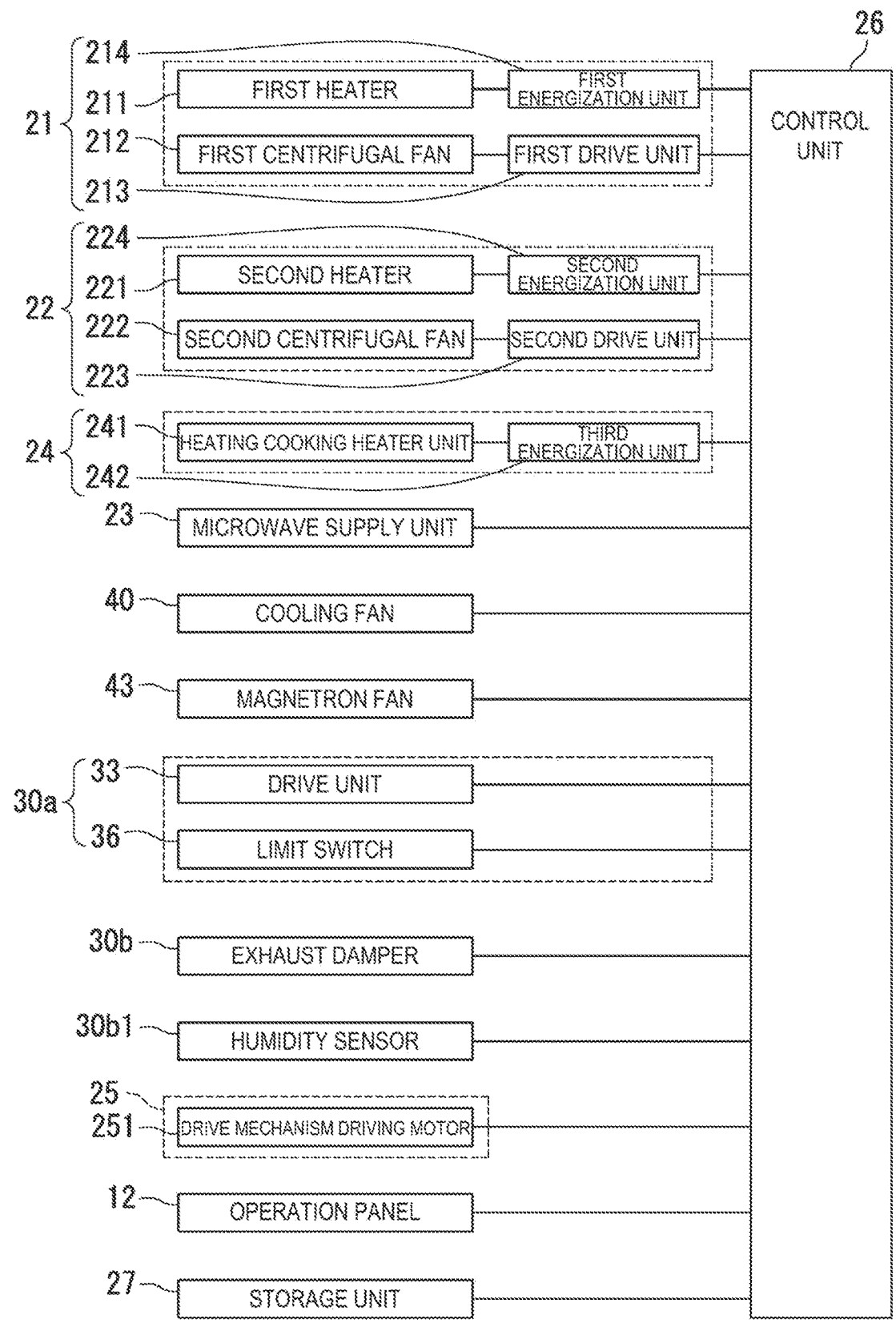
FIG. 31 is a block diagram illustrating a configuration of the heating cooking apparatus according to the embodiment of the present invention.

As illustrated in FIG. 31, the heating cooking apparatus 1 further includes the drive mechanism 25, the control unit 26, and a storage unit 27.

The drive mechanism 25 includes a drive mechanism driving motor 251 and a rack pinion mechanism. The rack pinion mechanism includes a pinion. The pinion is attached to a tip end portion of a motor shaft of the drive mechanism driving motor 251. The pinion engages with the rack portion of the support member 134 described with reference to FIG. 3 and FIG. 4.

The storage unit 27 includes a Random Access Memory (RAM) and a Read Only Memory (ROM). The storage unit 27 stores control programs used for controlling the operation of each portion of the heating cooking apparatus 1. The storage unit 27 stores setting information input by operating the operation panel unit 12.

The control unit 26 is a hardware circuit. The hardware circuit includes a processor such as a Central Processing Unit (CPU). The control unit 26 executes control programs stored in the storage unit 27 to thereby control the first drive unit 213, the first energization unit 214, the second drive unit 223, the second energization unit 224, the third energization unit 242, the microwave supply unit 23, the drive unit 33, the cooling fan 40, the magnetron fan 43, the drive mechanism driving motor 251, the operation panel unit 12, and the storage unit 27.

The control unit 26 controls the drive of the cooling fan 40 and the magnetron fan 43 according to the type of heating cooking mode received by the operation panel unit 12. When being operated by a user, the operation panel unit 12 receives a command to set any one of heating cooking mode among the microwave heating mode, the first hot air circulation heating mode, the second hot air circulation heating mode, and the grill heating mode. The control unit 26 sets the heating cooking mode according to the command received by the operation panel unit 12. For example, when the control unit 26 sets the first hot air circulation heating mode, the second hot air circulation heating mode, or the grill heating mode as the heating cooking mode, the control unit 26 drives the cooling fan 40. In this case, the control unit 26 does not drive the magnetron fan 43. When the control unit 26 sets the microwave heating mode as the heating cooking mode, for example, the control unit 26 drives the cooling fan 40 and the magnetron fan 43.

The control unit 26 controls the air supply damper 30a and the exhaust damper 30b according to the type of heating cooking mode received by the operation panel unit 12.

Specifically, when the control unit 26 sets the first hot air circulation heating mode, the second hot air circulation heating mode, or the grill heating mode as the heating cooking mode, the control unit 26 causes the air supply damper 30a and the exhaust damper 30b to close the air supply hole portions 10A1 and the exhaust hole portions 10B1, respectively. In this manner, when the first hot air circulation heating mode, the second hot air circulation heating mode, or the grill heating mode is executed, the accommodation space 1A is closed. As a result, the temperature in the accommodation space 1A is maintained.

In a case where the control unit 26 receives the on-signal from the limit switch 36 at the time of causing the air supply damper 30a to close the air supply hole portions 10A1, the control unit 26 causes the drive unit 33 not to rotate the cam 32. In a case where the control unit 26 receives the off-signal from the limit switch 36 at the time of causing the air supply damper 30a to close the air supply hole portions 10A1, the control unit 26 causes the drive unit 33 to start rotating the cam 32 and causes the drive unit 33 to stop rotating the cam 32 after a first predetermined time has elapsed from the time when the on-signal is received from the limit switch 36. When the control unit 26 causes the drive unit 33 to stop rotating the cam 32, the control unit 26 receives the on-signal from the limit switch 36. The first predetermined time is appropriately adjusted depending on the rotational speed of the cam 32, the first distance and the second distance described with reference to FIG. 16, and the like. The first predetermined time is, for example, 0.6 seconds in a case where the rotational speed of the cam 32 is 6 rpm. Thereby, the lid portion 34 can reliably close the air supply hole portions 10A1 of the right wall 10A.

Further, when the control unit 26 sets the microwave heating mode as the heating cooking mode, the control unit 26 causes the air supply damper 30a and the exhaust damper 30b to open the air supply hole portions 10A1 and the exhaust hole portions 10B1, respectively. In this manner, when the microwave heating mode is executed, the accommodation space 1A is opened. As a result, the damper unit 30 can detect a finish of an object to be heated that has been heated and cooked. Specifically, when the microwave heating mode is executed, water vapor emitted from the object to be heated in the accommodation space 1A travels from the accommodation space 1A into the exhaust damper 30b. The humidity sensor 30b1 detects an amount of vapor in the exhaust damper 30b. The amount of vapor in the exhaust damper 30b depends on the temperature of the object to be heated that has been heated and cooked. The control unit 26 determines whether the amount of vapor detected by the humidity sensor 30b1 is equal to or more than a predetermined value. The predetermined value indicates an amount of vapor that corresponds to a desired finishing temperature of the object to be heated. When the control unit 26 determines that the amount of vapor detected by the humidity sensor 30b1 is equal to or more than the predetermined value, the control unit 26 terminates the drive of the microwave supply unit 23. When the control unit 26 determines that the amount of vapor detected by the humidity sensor 30b1 is not equal to or more than the predetermined value, the control unit 26 does not terminate the drive of the microwave supply unit 23. The storage unit 27 stores the predetermined value. The air in the exhaust damper 30b is discharged to the outside of the heating cooking apparatus 1 through the exhaust hole portion 11BB described with reference to FIG. 6.

In a case where the control unit 26 receives the off-signal from the limit switch 36 at the time of causing the air supply damper 30a to open the air supply hole portions 10A1, the control unit 26 causes the drive unit 33 not to rotate the cam 32. In a case where the control unit 26 receives the on-signal from the limit switch 36 at the time of causing the air supply damper 30a to open the air supply hole portions 10A1, the control unit 26 causes the drive unit 33 to start rotating the cam 32 and causes the drive unit 33 to stop rotating the cam 32 after a second predetermined time elapses from the time when the off-signal is received from the limit switch 36. When the control unit 26 causes the drive unit 33 to stop rotating the cam 32, the control unit 26 receives the off-signal from the limit switch 36. The second predetermined time is appropriately adjusted depending on the rotational speed of the cam 32, the first distance and the second distance described with reference to FIG. 16, and the like. The second predetermined time is, for example, 2.2 seconds in a case where the rotational speed of the cam 32 is 6 rpm. Thereby, the lid portion 34 can reliably open the air supply hole portions 10A1 of the right wall 10A.

Figure 32:
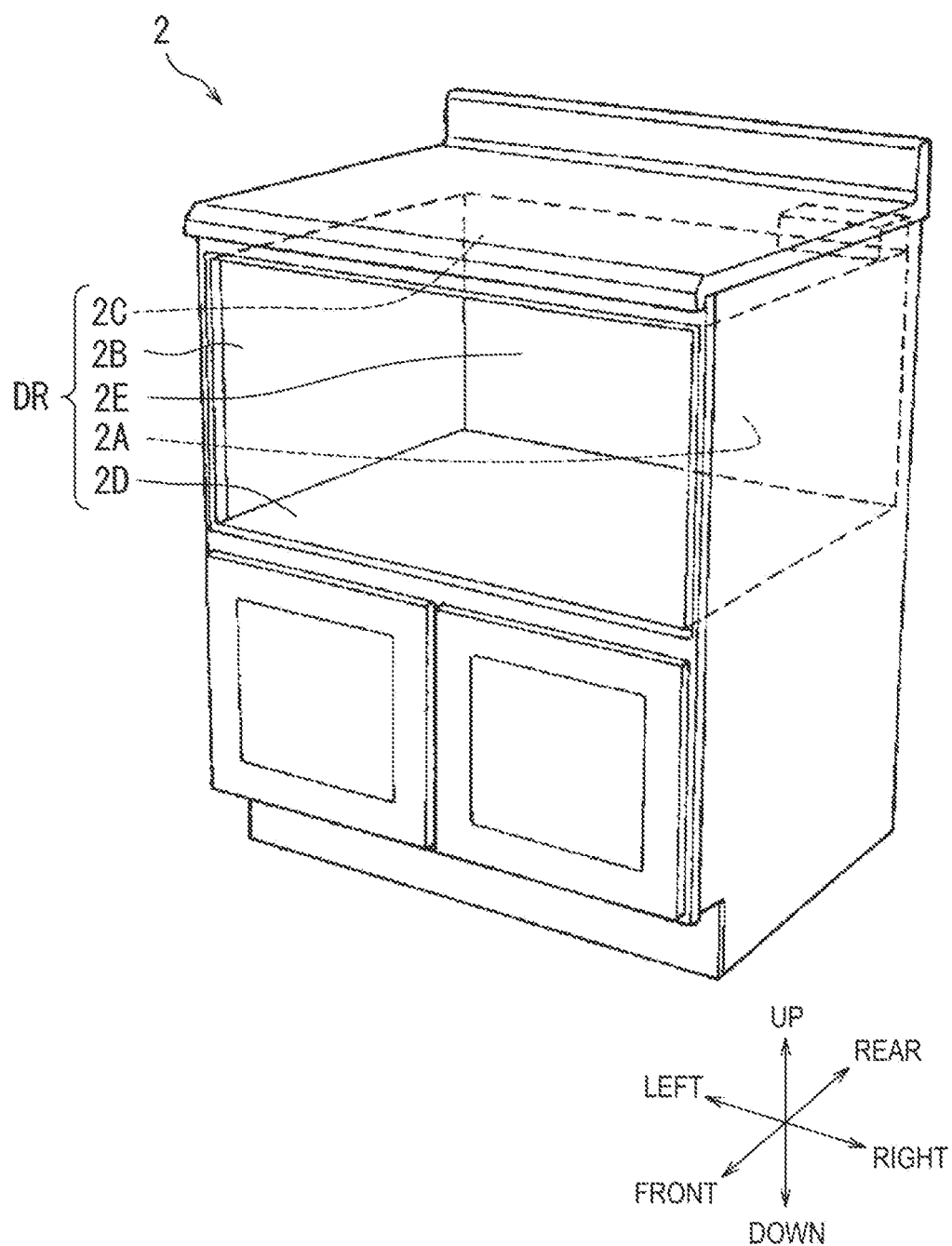
FIG. 32 is a perspective view of a cabinet in which the heating cooking apparatus according to the embodiment of the present invention is built.

Next, a cabinet 2 in which the heating cooking apparatus 1 is built will be described with reference to FIG. 32. FIG. 32 is a diagram illustrating an external appearance of the cabinet 2 in which the heating cooking apparatus 1 according to the present embodiment is built.

The heating cooking apparatus 1 is disposed in the form of being built into the cabinet 2. As illustrated in FIG. 32, the cabinet 2 includes an accommodation space DR. The heating cooking apparatus 1 is disposed in the accommodation space DR. The accommodation space DR is a space having a rectangular parallelepiped shape. The cabinet 2 includes a right inner surface 2A, a left inner surface 2B, an upper inner surface 2C, a lower inner surface 2D, and a rear inner surface 2E. The accommodation space DR is formed by the right inner surface 2A, the left inner surface 2B, the upper inner surface 2C, the lower inner surface 2D, and the rear inner surface 2E.

As described with reference to FIG. 1 to FIG. 32, the heating cooking apparatus 1 includes the heating cooking chamber 10, the housing 14, the air supply damper 30a, and the microwave supply unit 23. The air supply damper 30a includes the flowing portion 31, the cam 32, the drive unit 33, the lid portion 34, and the tension spring 35. The flowing portion 31 includes the opening 310B that faces the air supply hole portions 10A1. The flowing portion 31 and the right wall 10A form an inner space IR therebetween. The cam 32 fits into the opening 310B. The drive unit 33 rotates the cam 32. The lid portion 34 is disposed in the inner space IR. The lid portion 34 opens or closes the air supply hole portions 10A1 in response to the rotation of the cam 32. The cam 32 presses the lid portion 34 against biasing force of the tension spring 35 to cause the lid portion 34 to close the air supply hole portions 10A1 of the right wall 10A. Thus, the cam 32 is rotated by the drive unit 33 while being fitted into the opening 310B of the flowing portion 31. In other words, the direction of the rotation axis line AX of the cam 32 is substantially perpendicular relative to the outer surface of the right wall 10A. For this reason, the height of the air supply damper 30a in the left-right direction is lower than the height of a conventional damper unit in which the direction of the rotation axis line AX of the cam 32 is not substantially perpendicular relative to the outer surface of the right wall 10A. For this reason, the heating cooking apparatus 1 uses less space between the outer surface of the heating cooking chamber 10 and the inner surface of the housing 14 than that in a case where a conventional damper unit is used. That is, the heating cooking apparatus 1 becomes more compact.

As described with reference to FIG. 1 to FIG. 32, the cam 32 includes the cam body 320 and the extension portion 321. The flowing portion 31 includes the regulating portion 311. In a state where the lid portion 34 closes the air supply hole portions 10A1 of the right wall 10A, the regulating portion 311 abuts against the extension portion 321 of the cam 32 to regulate the movement of the lid portion 34 in the separation direction D5. Thus, the regulating portion 311 inhibits the occurrence of uplifting of the lid portion 34 due to the biasing force of the tension spring 35. As a result, the heating cooking apparatus 1 can reliably close the heating cooking chamber 10.

As described with reference to FIG. 1 to FIG. 32, the regulating portion 311 comes into point-contact with the extension portion 321 of the cam 32. Thus, frictional force between the regulating portion 311 and the extension portion 321 is weaker than that in a case where the regulating portion 311 comes into surface-contact with the extension portion 321. Thus, the drive unit 33 can more smoothly rotate the cam 32. As a result, the heating cooking apparatus 1 can more reliably close the heating cooking chamber 10.

As described with reference to FIG. 1 to FIG. 32, the extension portion 321 of the cam 32 has a substantially arc shape in the clockwise direction D4 along the cam body 320. Thus, the cam 32 has a portion where the extension portion 321 is not disposed. When the air supply damper 30a is assembled, by aligning a portion where the extension portion 321 of the cam 32 is not disposed and the regulating portion 311 of the flowing portion 31, the cam 32 can be fitted into the opening 310B of the flowing portion 31 without the extension portion 321 of the cam 32 being caught by the regulating portion 311. That is, assembly accuracy of the air supply damper 30a is improved. Additionally, when the air supply damper 30a is assembled, the cam 32 is unlikely to be damaged.

As described with reference to FIG. 1 to FIG. 32, the cam body 320 includes the abutting surface 32A1. The abutting surface 32A1 does not abut against the lid portion 34 in a state where the lid portion 34 opens the air supply hole portions 10A1 of the right wall 10A. The regulating portion 311 abuts against the extension portion 321 of the cam 32 before the abutting surface 32A1 abutting against the lid portion 34 depending on the rotation of the cam 32. The extension portion 321 of the cam 32 abuts against the regulating portion 311 before the lid portion 34 closing the air supply hole portions 10A1 of the right wall 10A. Thereby, the extension portion 321 of the cam 32 more reliably abuts against the regulating portion 311 of the flowing portion 31 when the abutting surface 32A1 of the cam 32 presses the lid portion 34. As a result, the heating cooking apparatus 1 can more reliably close the heating cooking chamber 10.

As described with reference to FIG. 1 to FIG. 32, the cam 32 further includes the protrusion portion 322. The protrusion portion 322 is located at a position farther from the right wall 10A than the extension portion 321 of the cam 32 in the direction of the rotation axis line AX of the cam 32. The air supply damper 30a includes the limit switch 36. The limit switch 36 faces the cam body 320 in a direction intersecting the rotation axis line AX of the cam 32. The air supply damper 30a can detect the position of the protrusion portion 322 of the cam 32 based on a signal output by the limit switch 36. Thus, the heating cooking apparatus 1 can more reliably close the heating cooking chamber 10 by controlling the drive unit 33 based on the signal output by the limit switch 36.

As described with reference to FIG. 1 to FIG. 32, the drive unit 33 includes the motor shaft 331, the motor body 332, and the output shaft 334. The output shaft 334 is eccentric relative to the motor shaft 331. The driving force of the output shaft 334 is transmitted from the motor shaft 331. The output shaft 334 rotates the cam 32 based on the driving force transmitted from the motor shaft 331. As a result, the heating cooking apparatus 1 can more reliably obtain a torque for rotating the cam 32. Because the output shaft 334 is eccentric relative to the motor shaft 331, a portion of the cam 32 is exposed from the drive unit 33.

As described with reference to FIG. 1 to FIG. 32, the flowing portion 31 includes the plurality of ventilation holes 310C. Thus, the flowing portion 31 is less likely to interfere with the blown air flow F flowing therethrough.

As described with reference to FIG. 1 to FIG. 32, the heating cooking apparatus 1 includes the pull-out body 13. The heating cooking apparatus 1 is disposed in the form of being built into the cabinet 2. Thus, the heating cooking apparatus 1 does not occupy the top panel of the cabinet 2. As a result, for example, a user can easily perform work or the like on the top panel of the cabinet 2. The work on the top panel of the cabinet 2 includes preparation work of an object to be heated before heating and cooking and includes cooking work of the object to be heated after heating and cooking. The heating cooking apparatus 1 includes the pull-out body 13, and thus opening and closing of the door portion 131 are facilitated even when the heating cooking apparatus 1 is disposed in the form of being built into the cabinet 2.

The embodiment of the present invention has been described above with reference to the drawings (FIG. 1 to FIG. 32). Note that the present invention is not limited to the above-described embodiment and can be implemented in various modes within the scope not departing from the gist of the present invention (for example, (1) to (11) described below). The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. Further, the material, shape, dimensions, and the like of each of the constituent elements illustrated in the embodiment described above are merely examples and are not particularly limited, and various modifications can be made within the scope not substantially departing from the effects of the present invention.

(1) As described with reference to FIG. 1 to FIG. 32, in the present embodiment, the heating cooking apparatus 1 includes the first air sending unit 21, the second air sending unit 22, and the grill unit 24, but the present invention is not limited thereto. The heating cooking apparatus 1 may not include the first air sending unit 21, the second air sending unit 22, and the grill unit 24. In addition, for example, the heating cooking apparatus 1 may include one or two of the first air sending unit 21, the second air sending unit 22, and the grill unit 24.

(2) As described with reference to FIG. 1 to FIG. 32, in the present embodiment, the cam 32 includes the extension portion 321, and the flowing portion 31 includes the regulating portion 311, but the present invention is not limited thereto. For example, the cam 32 may not include the extension portion 321, and the flowing portion 31 may not include the regulating portion 311.

(3) As described with reference to FIG. 1 to FIG. 32, in the present embodiment, the regulating portion 311 of the flowing portion 31 comes into point-contact with the extension portion 321 of the cam 32, but the present invention is not limited thereto. For example, the regulating portion 311 may come into surface-contact with the extension portion 321 of the cam 32.

(4) As described with reference to FIG. 1 to FIG. 32, in the present embodiment, the extension portion 321 of the cam 32 has a substantially arc shape, but the present invention is not limited thereto. For example, the extension portion 321 of the cam 32 may be formed along the entire circumference of the cam 32.

(5) As described with reference to FIG. 1 to FIG. 32, in the present embodiment, the regulating portion 311 of the flowing portion 31 abuts against the extension portion 321 of the cam 32 before the abutting surface 32A1 of the cam 32 abutting against the lid portion 34 depending on the rotation of the cam 32, but the present invention is not limited thereto. For example, the regulating portion 311 of the flowing portion 31 may abut against the extension portion 321 of the cam 32 at the same time that the abutting surface 32A1 of the cam 32 abuts against the lid portion 34 depending on the rotation of the cam 32.

(6) As described with reference to FIG. 1 to FIG. 32, in the present embodiment, the cam 32 includes the protrusion portion 322, but the present invention is not limited thereto. The cam 32 may not include the protrusion portion 322.

(7) As described with reference to FIG. 1 to FIG. 32, in the present embodiment, the air supply damper 30a includes the limit switch 36, but the present invention is not limited thereto. The air supply damper 30a may not include the limit switch 36.

(8) As described with reference to FIG. 1 to FIG. 32, in the present embodiment, the output shaft 334 is eccentric relative to the motor shaft 331, but the present invention is not limited thereto. For example, the center of rotation of the output shaft 334 and the center of rotation of the motor shaft 331 may be the same. That is, the output shaft 334 may be omitted from the drive unit 33, and the motor shaft 331 may function as an output shaft.

(9) As described with reference to FIG. 1 to FIG. 32, in the present embodiment, the flowing portion 31 includes the plurality of ventilation holes 310C, but the present invention is not limited thereto. The flowing portion 31 may not include the ventilation holes 310C.

(10) As described with reference to FIG. 1 to FIG. 32, in the present embodiment, the heating cooking apparatus 1 includes the pull-out body 13, but the present invention is not limited thereto. The heating cooking apparatus 1 may not include the pull-out body 13.

(11) As described with reference to FIG. 1 to FIG. 32, in the present embodiment, the heating cooking apparatus 1 is disposed in the form of being built into the cabinet 2, but the present invention is not limited thereto. The heating cooking apparatus 1 may not be disposed in the form of being built into the cabinet 2.

INDUSTRIAL APPLICABILITY

The present invention is useful in the field of a heating cooking apparatus, for example.

REFERENCE SIGNS LIST

1 Heating cooking apparatus
10 Heating cooking chamber
10A Right wall
10A1 Air supply hole portion
14 Housing
21 First air sending unit
23 Microwave supply unit
30a Air supply damper
31 Flowing portion
310B Opening
32 Cam
33 Drive unit
34 Lid portion
35 Tension spring
IR Inner space
D5 Separation direction

The invention claimed is:
1. A heating cooking apparatus comprising:
a heating cooking chamber including a wall portion and configured to accommodate an object to be heated, the wall portion including a through hole;
a housing configured to accommodate the heating cooking chamber;
an opening/closing portion attached to the heating cooking chamber and configured to open or close the through hole; and
a microwave supply unit configured to supply microwaves to an interior of the heating cooking chamber,
wherein the opening/closing portion includes:
a flowing portion including an opening and attached to the wall portion to form, between the flowing portion and the wall portion, an inner space where air flows, the opening facing the through hole,
a cam fitting into the opening,
a drive unit configured to rotate the cam,
a lid portion disposed in the inner space and configured to open or close the through hole in response to a rotation of the cam, and a biasing portion configured to bias the lid portion in a separation direction indicating a direction away from the through hole, the cam includes a cam body and an extension portion extending from the cam body in a direction intersecting a rotation axis line of the cam, the cam presses the lid portion against a biasing force of the biasing portion to cause the lid portion to close the through hole, the flowing portion further includes a regulating portion, and the regulating portion is positioned along the separation direction with respect to the extension portion, and abuts, in a state in which the lid portion closes the through hole, against the extension portion to regulate movements of the lid portion and the cam along the separation direction.

2. The heating cooking apparatus according to claim 1, wherein the regulating portion comes into contact with the extension portion.

3. The heating cooking apparatus according to claim 1, wherein the extension portion has a substantially arc shape along a circumferential direction of the cam body.

4. The heating cooking apparatus according to claim 1, wherein the flowing portion further includes a ventilation hole located outward from the opening in a direction intersecting the rotation axis line of the cam.

5. The heating cooking apparatus according to claim 1, further comprising:
a pull-out body configured to be pulled out freely relative to the heating cooking chamber,
wherein the heating cooking apparatus is disposed to be built into a cabinet.

6. A heating cooking apparatus comprising:
a heating cooking chamber including a wall portion and configured to accommodate an object to be heated, the wall portion including a through hole;
a housing configured to accommodate the heating cooking chamber;
an opening/closing portion attached to the heating cooking chamber and configured to open or close the through hole; and
a microwave supply unit configured to supply microwaves to an interior of the heating cooking chamber,
wherein the opening/closing portion includes:
a flowing portion including an opening and attached to the wall portion to form, between the flowing portion and the wall portion, an inner space where air flows, the opening facing the through hole,
a cam fitting into the opening,
a drive unit configured to rotate the cam,
a lid portion disposed in the inner space and configured to open or close the through hole in response to a rotation of the cam, and
a biasing portion configured to bias the lid portion in a separation direction indicating a direction away from the through hole,
the cam includes a cam body and an extension portion extending from the cam body in a direction intersecting a rotation axis line of the cam,
the cam presses the lid portion against a biasing force of the biasing portion to cause the lid portion to close the through hole,
the flowing portion further includes a regulating portion,
the regulating portion is positioned along the separation direction with respect to the extension portion, and abuts, in a state in which the lid portion closes the through hole, against the extension portion to regulate movements of the lid portion and the cam along the separation direction,
the cam body further includes an abutting portion abutting against the lid portion in a state in which the lid portion closes the through hole,
the abutting portion does not abut against the lid portion in a state in which the lid portion opens the through hole, and
the regulating portion abuts against the extension portion before the abutting portion abuts against the lid portion based on the rotation of the cam.

7. The heating cooking apparatus according to claim 6, wherein the cam further includes a protrusion portion protruding from the cam body in a direction intersecting the rotation axis line of the cam,
the protrusion portion is located at a position farther from the wall portion than the extension portion in a direction of the rotation axis line of the cam,
the opening/closing portion further includes a position detection unit configured to detect a position of the abutting portion based on the protrusion portion, and
the position detection unit faces the cam body in a direction intersecting the rotation axis line of the cam.

8. A heating cooking apparatus comprising:
a heating cooking chamber including a wall portion and configured to accommodate an object to be heated, the wall portion including a through hole;
a housing configured to accommodate the heating cooking chamber;
an opening/closing portion attached to the heating cooking chamber and configured to open or close the through hole; and
a microwave supply unit configured to supply microwaves to an interior of the heating cooking chamber,
wherein the opening/closing portion includes:
a flowing portion including an opening and attached to the wall portion to form, between the flowing portion and the wall portion, an inner space where air flows, the opening facing the through hole,
a cam fitting into the opening,
a drive unit configured to rotate the cam,
a lid portion disposed in the inner space and configured to open or close the through hole in response to a rotation of the cam, and
a biasing portion configured to bias the lid portion in a separation direction indicating a direction away from the through hole,
the cam presses the lid portion against a biasing force of the biasing portion to cause the lid portion to close the through hole, and
the drive unit includes;
a motor shaft,
a motor body configured to rotate the motor shaft, and
an output shaft that is eccentric relative to the motor shaft, wherein:
the output shaft receives a driving force transmitted from the motor shaft, and
the output shaft rotates the cam based on the driving force transmitted from the motor shaft.

* * * * *